US007495040B2

(12) United States Patent
Masumi et al.

(10) Patent No.: US 7,495,040 B2
(45) Date of Patent: Feb. 24, 2009

(54) ACTINIC RAY CURABLE COMPOSITION, IMAGE FORMING METHOD USING THE SAME AND INK-JET RECORDING APPARATUS USING THE SAME

(75) Inventors: Satoshi Masumi, Odawara (JP); Daisuke Ishibashi, Hino (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 564 days.

(21) Appl. No.: 11/036,094

(22) Filed: Jan. 18, 2005

(65) Prior Publication Data

US 2005/0165123 A1 Jul. 28, 2005

(30) Foreign Application Priority Data

Jan. 22, 2004 (JP) ............................ 2004-014070
Mar. 22, 2004 (JP) ............................ 2004-082198

(51) Int. Cl.
*C09D 11/00* (2006.01)

(52) U.S. Cl. ........................ 523/160; 523/161; 524/88; 524/89; 524/90

(58) Field of Classification Search ................. 523/160, 523/161; 524/88, 89, 90
See application file for complete search history.

(56) References Cited

U.S. PATENT DOCUMENTS 5,889,084 A * 3/1999 Roth .......................... 523/161
2004/0075726 A1* 4/2004 Hirai .......................... 347/102

* cited by examiner

*Primary Examiner*—Edward J Cain
(74) *Attorney, Agent, or Firm*—Finnegan, Henderson, Farabow, Garrett, & Dunner, L.L.P.

(57) ABSTRACT

An actinic ray curable composition containing a phthalocyanine pigment or a carbon black pigment; a dispersant; a cationically polymerizable monomer; a photo acid generator; and a phthalocyanine derivative.

19 Claims, 2 Drawing Sheets

ACTINIC RAY CURABLE COMPOSITION, IMAGE FORMING METHOD USING THE SAME AND INK-JET RECORDING APPARATUS USING THE SAME

TECHNICAL FIELD

The present invention relates to an actinic ray curable composition used for stably forming a high resolution image, an image forming method using the same, and an ink-jet recording apparatus using the same.

BACKGROUND

In recent years, the ink-jet recording method has found wide application in photography, a variety of printing and in special printing, for example, marking and color filters, because it enables easy and low cost printing. Specifically, available is high image quality comparable to that of silver salt photograph, which has become possible by utilizing (i) an ink-jet recording apparatus in which ejection of minute droplets is controlled, (ii) an ink-jet ink exhibiting a wide range of color reproducibility, high durability and improved ejecting properties and (iii) an ink-jet recording sheet having drastically improved ink absorbing property, coloring property and surface gloss. Recent improvements in image quality of ink-jet recording methods have been achieved only by integrating ink-jet recording apparatus, improved ink-jet ink and improved ink-jet recording sheets.

However, an ink-jet system which requires a special ink-jet recording sheet is not fully recommended because the recording medium is limited and the cost for the recording medium increases. Therefore, many attempts of ink-jet recording have been made to print onto recording media other than special ink-jet recording sheets, the attempts include (i) a phase-change ink-jet recording method utilizing a wax ink which is solid state at ambient temperature; (ii) a solvent-type ink jet recording method in which a rapid-drying organic solvent is used as a main component of the ink; and (iii) an actinic ray curable ink-jet recording method in which the ink is cross-linked, after printing, by irradiating it with actinic rays, for example, ultraviolet (UV) rays.

Among these, an actinic ray curable ink-jet recording method has received close attention because of the relatively lower odor of the ink compared to that of a solvent-type. Actinic ray curable ink-jet recording methods have been disclosed, for example, in Japanese Patent Publication Open to Public Inspection (hereafter referred to as JP-A) Nos. 6-200204 and 2000-504778.

However, when these inks are employed, the dot diameter of the ink ejected onto the recording material tends to change depending on the kinds of recording material or operating conditions, and it is therefore relatively difficult to form a high resolution image on various recording materials.

Recently, many UV curable ink-jet recording methods using cationically polymerizable compounds have been proposed. UV-curable ink-jet ink is not affected by oxygen, however, it may have problems in that the polymerization reaction is affected by moisture or, under a certain curing condition, the printed ink wrinkles while shrinking in the process of polymerization.

As described above, an image forming method employing a UV curable ink-jet recording method enables low cost formation of high resolution images as well as image formation onto a recording material which does not absorb recording ink. However, this method also has problems which are characteristic for the UV curable ink-jet recording method. For example, when printing is carried out on a recording material which does not absorb the ink, a noticeable degradation of image quality may occur due to mixing of adjacent dots placed on the recording material. Specifically, when a high resolution image is required, mixing of dots of different colors may cause a big problem. In attempts to solve this problem, actinic ray curable ink-jet inks employing photo polymerizable oxirane compounds, vinyl ether compounds or oxetane compounds have been disclosed (for example in Patent Documents 1 and 2). Also, actinic ray curable ink-jet inks employing photo polymerizable alicyclic epoxy compounds or alicyclic oxetane compounds have been disclosed (for example in Patent Documents 3 and 4). However, even by employing the above mentioned methods, the problem of dot blur has not been fully overcome.

In the case of an aqueous ink-jet recording system, the problem of dot blur has been solved by improving the absorbability of the ink to the recording material by means of using a special ink-jet recording sheet or using additives to the ink having various functions, however, in the case of the ink-jet recording system in which the recording material does not have absorbability of the ink, it is relatively difficult, at present, to find an adequate answer to fully overcome the problem. Specifically, in the case of a high rate printing, the recording material after printing tends to be rolled up in a roller, accordingly, development of an actinic ray curable ink-jet ink exhibiting a rapid curing property is desired.

(Patent Document 1)
JP-A No. 2001-220526
(Patent Document 2)
JP-A No. 2002-188025
(Patent Document 3)
JP-A No. 2002-317139
(Patent Document 4)
JP-A No. 2003-55449

SUMMARY OF THE INVENTION

An object of the present invention is to provide an actinic ray curable composition exhibiting storage stability and superior curability, and also to provide an image forming method using the actinic ray curable composition and an ink-jet recording apparatus using the same.

One embodiment of the present invention is an actinic ray curable composition containing a phthalocyanine pigment or a carbon black pigment; a dispersant; a cationically polymerizable monomer; a photoacid generator; and a phthalocyanine derivative.

DESCRIPTION OF THE PREFERRED EMBODIMENT

Figure 1:
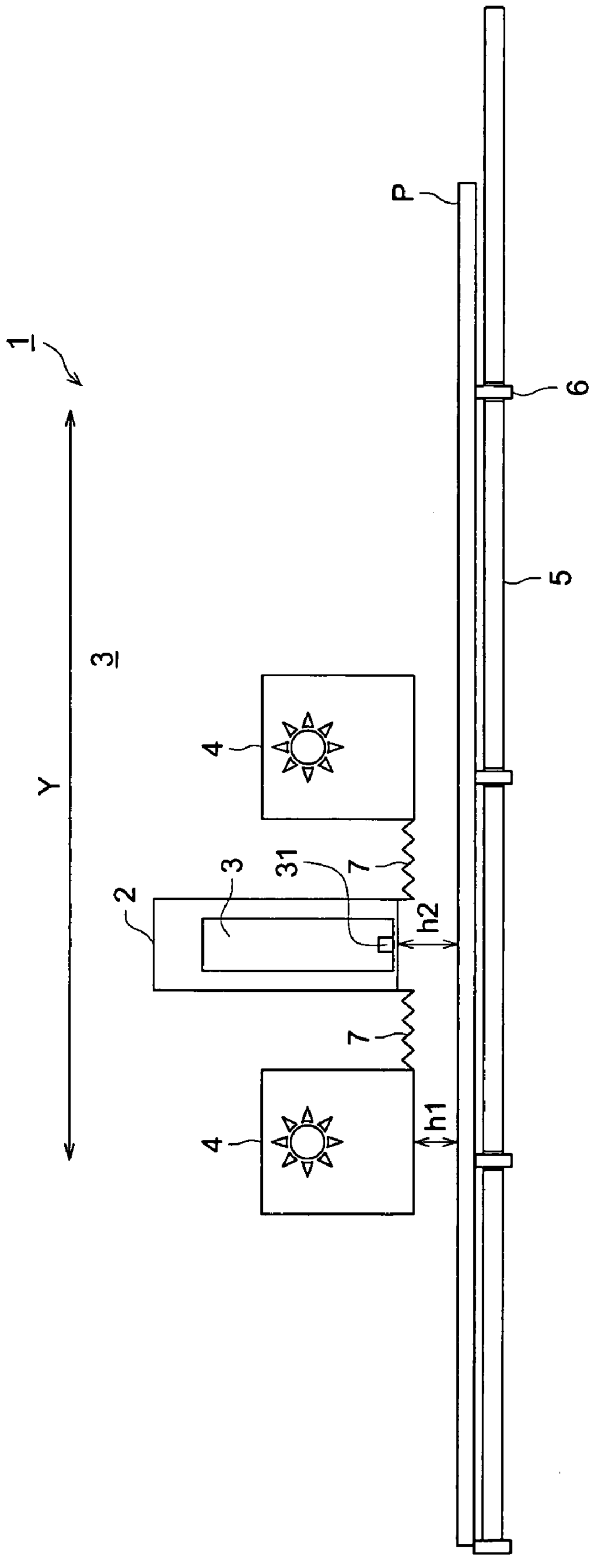
FIG. 1 is a front view of the main section of the ink-jet recording apparatus illustrating one embodiment of the present invention.

The above object of the present invention is achieved by the following structure.

(1) An actinic ray curable composition containing:
a phthalocyanine pigment or a carbon black pigment;
a dispersant;
a cationically polymerizable monomer;

a photoacid generator; and
a phthalocyanine derivative.

(2) The actinic ray curable composition of Item (1) containing the phthalocyanine pigment.

(3) The actinic ray curable composition of Item (1) containing the carbon black pigment.

(4) The actinic ray curable composition of any one of Items (1) to (3), wherein the cationically polymerizable monomer has an oxetane ring in the molecule.

(5) The actinic ray curable composition of Item (4), further containing an cationically polymerizable monomer having an oxirane ring in the molecule.

(6) The actinic ray curable composition of Item (5), wherein the cationically polymerizable monomer having an oxirane ring is represented by Formula (1):

Formula (1)

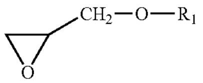

wherein $R_1$ represents a substituted or unsubstituted alkyl group of 1 to 10 carbon atoms, a substituted or unsubstituted aromatic group or an acyl group.

(7) The actinic ray curable composition of Item (5), wherein the cationically polymerizable monomer having an oxirane ring is represented by Formula (2):

Formula (2)

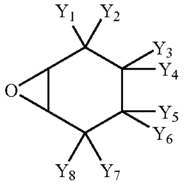

wherein $Y_1$ to $Y_8$ each independently represent a hydrogen atom, a substituted or unsubstituted alkyl group, a carbonyl group or an ether group.

(8) The actinic ray curable composition of Item (5), wherein the cationically polymerizable monomer having an oxirane ring is α-pinene oxide.

(9) The actinic ray curable composition of Item (5), wherein the cationically polymerizable monomer having an oxirane ring is 1,2:8,9-diepoxylimonene.

(10) The actinic ray curable composition of Item (5), wherein the cationically polymerizable monomer having an oxirane ring is an epoxidized vegetable oil having an unsaturated bond in the molecule.

(11) The actinic ray curable composition of Item (5), wherein the cationically polymerizable monomer having an oxirane ring is represented by Formula (A):

Formula (A)

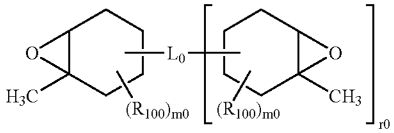

wherein $R_{100}$ represents a substituent, m0 represents an integer of 0 to 2, r0 represents an integer of 1 to 3 and $L_0$ represents a single bond or a linking group having 1 to 15 carbon atoms and a valence of r0+1, which may have an oxygen atom or a sulfur atom in a main chain of the linking group.

(12) An image forming method containing the steps of:
ejecting droplets of the actinic ray curable composition of any one of Items (1) to (11) onto a recording sheet to form an image; and
irradiating actinic rays to the formed image,
wherein the irradiating step is carried out between 0.001 and 1 second after the ejected droplets reach the recording sheet.

(13) An image forming method containing the steps of:
ejecting droplets of the actinic ray curable composition of any one of Items (1) to (11) onto a recording sheet to form an image; and
irradiating actinic rays to the formed image,
wherein a thickness of the actinic ray curable composition cured via irradiating the actinic rays is in the range of 2 to 25 μm.

(14) An image forming method containing the steps of:
ejecting droplets of the actinic ray curable composition of any one of Items (1) to (11) onto a recording sheet to form an image; and
irradiating actinic rays to the formed image,
wherein the droplets of the actinic ray curable composition ejected from each nozzle of the ink-jet recording head have a volume of 2 to 20 pl.

(15) An image forming method containing the steps of:
ejecting droplets of the actinic ray curable composition of any one of Items (1) to (11) onto a recording sheet to form an image; and
irradiating actinic rays to the formed image,
wherein the ink-jet recording head is a line head.

(16) An ink-jet recording apparatus for carrying out the image forming method of any one of Items (12) to (15),
wherein the actinic ray curable composition and the ink-jet recording head are heated at 35 to 100° C. before ejecting the actinic ray curable composition from the ink-jet recording head.

The actinic ray curable composition of the present invention (hereafter also referred to as the composition of the present invention) containing a phthalocyanine pigment or a carbon black pigment; a dispersant; a cationically polymerizable monomer; a photo acid generator; and a phthalocyanine derivative was found to exhibit excellent curability, a small amount of color mixing, enabling stable formation of high resolution images.

A phthalocyanine pigment to be used as one of the colorants will be explained, first.

The phthalocyanine pigment used in the present invention is mainly a blue pigment, examples of which include: (i) phthalocyanine C. I. Pigment Blue 15, 15:1, 15:2, 15:3, 15:4 and 15:6, all of which are copper-phthalocyanine; (ii) monochloro- or low chloro-copper phthalocyanine; (iii) C.I. Pigment blue 16 which is a non-metal phthalocyanine; and phthalocyanine having Zn, AL or Ti as a central metal.

Besides the above mentioned commercially available phthalocyanine pigments, those known in the literature may also be used, for example: Color Index (ed. by The Society of Dyers and Colorists); "Kaitei Shinban Ganryo Binran" (ed. by Nihon Ganryo Gijutsu Kyokai, 1989); "Saishin Ganryo Oyou Gijutsu" (CMC Publishing Co., Ltd., 1986); "Insatsu Inki Gijutsu" (CMC Publishing Co., Ltd., 1984); and "Industrial Organic Pigments" co-authored by W. Herbst and K. Hunger (VCH Verlagsgesellschaft, 1993).

A carbon black pigment to be used as one of the colorants will be explained, in the next.

Known carbon black pigments may be used in the present invention, including, for example, listed is C.I. Pigment Black 7.

Examples of carbon black pigments include: Mitsubishi Chemical Corp. Nos. 900, 2300, MCF-88, 33, 40, 45, 52, 44, 47, MA7, MA8, MA11 MA100 and 2200B; Columbia Chemical Co. Raven 700, Raven 5750, Raven 5250, Raven 5000, Raven 3500, Raven 1255; Cabot Corp. Regal 400R, Regal 330R, Regal 660R, Mogul L, Monarch 700, Monarch 800, Monarch 880, Monarch 900, Monarch 1000, Monarch 1100, Monarch 1300, Monarch 1400; and Degussa Co. Color Black FW1, Color Black FW2, Color Black FW2V, Color Black FW18, Color Black FW200, Color Black S150, Color Black S160, Color BlackS 170 and Printex 35, Printex U, Printex V, Printex 140U, Printex 140V, Special Black 6, Special Black 5, Special Black 4A, Special Black 4, NIPex 35, NIPex 60, NIPex 70, NIPex 90 and NIPex 150; and Kansai Coke and Chemicals Co., Ltd. Maxsorb G-40 Maxsorb G-15 and Maxsorb G-08.

The carbon black used in the present invention preferably has a larger BET surface area and smaller particle diameters. The preferable BET surface area is 200 to 300 $m^2/g$. A BET surface area larger than 300 $M^2/g$ results in too small particle diameters which tend to cause unstable dispersion of the carbon black pigment in the composition of the present invention, while a BET surface area smaller than 200 $m^2/g$ results in too large particle diameters which may cause unstable ejection of the composition.

Preferable DBP (Dibutyl phthalate) oil absorption is 50 to 150 ml/10 g and more preferably 50 to 100 ml/100 g.

Besides the above mentioned commercially available carbon black pigments, those known in the literature may also be used, for example: Color Index (ed. by The Society of Dyers and Colorists); "Kaitei Shinban Ganryo Binran" (ed. by Nihon Ganryo Gijutsu Kyokai, 1989); "Saishin Ganryo Oyou Gijutsu" (CMC Publishing Co., Ltd., 1986) and "Industrial Organic Pigments" co-authored by W. Herbst and K. Hunger (VCH Verlagsgesellschaft, 1993).

To disperse the above-described pigment, for example, a ball mill, a sand mill, an attritor mill, a roll mill, an agitator, a Henschel mixer, a colloidal mixer, a ultrasonic homogenizer, a pearl mill, a wet jet mill and a paint shaker may be utilized. Further, a dispersant may be added to disperse the pigment. As a dispersant, a polymer dispersant is preferably utilized, examples thereof including Solsperse Series manufactured by Avecia Co. (for example, Solsperse 24000 and 32000); PB Series by Ajinomoto-Fine Techno Co., Inc. (for example, PB821 and PB822); and Products from EFKA Additives (for example, EFKA-4046, 4300, 4330, 7411, 7462, 7476 and, 7496,). Further, as a dispersion aid, a synergist corresponding to each kind of pigment may also be utilized. The dispersant and dispersion aid are preferably added in a range of 1 to 50 weight parts based on 100 parts of the pigment. As a dispersion medium, a solvent or a polymerizable compound is utilized, however, the actinic ray curable ink used in the present invention is preferably an ink containing no solvent, since curing is carried out immediately after the ink is deposited on the recording material. When a solvent remains in a cured image, resistance to solvents may be reduced and VOC (Volatile Organic Compound) of residual solvent may become a problem. Therefore, as a dispersion medium, polymerizable compounds are used, but not a solvent. Specifically, monomers having the lowest viscosity among those are preferably used in view of optimal dispersion.

The mean particle diameter of a pigment is preferably 0.08 to 0.5 μm, and the maximum particle diameter is preferably 0.3 to 10 μm and more preferably from 0.3 to 3 μm. A pigment, dispersant, dispersion medium, dispersion condition, and filtering condition are selected to suitably disperse the pigment particles of which diameter is in the range described above. By this particle diameter control, it is possible to reduce clogging of the head nozzles and maintain stable storage of the ink, as well as its transparency and curing sensitivity. The content of a pigment is preferably 1 to 10 weight % based on the total weight of the composition.

One of the characteristic features of the actinic ray curable composition of the present invention is that a cationically polymerizable monomer is used as a photo polymerizable compound.

The cationically polymerizable monomer of the present invention represents a compound which is polymerized via cationic polymerization, examples thereof including (1) compounds having an oxirane ring, (2) stylene derivatives, (3) vinyl naphthalene derivativse, (4) vinyl ethers, (5) N-vinyl compounds and (6) compounds having an oxetane ring, and more preferable is a compound having an oxetane ring, used together with a compound having an oxirane ring.

As a compound having an oxirane ring as in the above example (1), prepolymers having two or more oxirane rings are listed. Examples of these prepolymers include: alicyclic polyepoxides, polyglycidyl esters of polybasic acids, polyglycidyl ethers of polyalcohols, polyglycidyl ethers of polyoxyalkylene glycols, polyglycidyl ethers of aromaticpolyols, and hydrogenized polyglycidyl ethers of aromaticpolyols; urethane epoxides; and epoxidized polybutadienes. These prepolymers may be used alone or in combination.

(2) stylene derivatives:

Examples are: styrene, p-methylstyrene, p-methoxystyrene, β-methylstyrene, p-methyl-β-methylstyrene, α-methylstyrene and p-methoxy-β-methylstyrene.

(3) vinyl naphthalene derivatives:

Examples are: 1-vinylnaphthalene, α-methyl-1-vinylnaphthalene, β-methyl-1-vinylnaphthalene, 4-methyl-1-vinylnaphthalene and 4-methoxy-1-vinylnaphthalene.

(4) vinyl ethers:

Examples are: isobutyl ethers, ethylvinyl ethers, phenylvinyl ethers, p-methylphenylvinyl ethers, p-methoxyphenylvinyl ethers, α-methylphenylvinyl ethers, β-methylisobutylvinyl ethers and β-chloroisobutylvinyl ethers.

(5) N-vinyl compounds:

Examples are: N-vinylcarbazoles, N vinylpyrrolidones, N-vinylindoles, N-vinylpyrroles, N-vinylphenothiazines, N-vinylacetanilides, N-vinylethylacetamides, N-vinylsuccinimides, N-vinylphthalimides, N-vinylcaprolactams and N-vinylimidazoles.

(6) compounds having an oxetane ring:

Examples of the compounds having an oxetane ring include any of the known oxetane compounds, for example, disclosed in JP-A Nos. 2001-220526 and 2001-310937. It is preferable to use together a mono-reactive oxetane compound having one oxetane ring and a multi-functional oxetane compound having two or more oxetane rings. However, an oxetane compound having five or more oxetane rings may suffer from (i) difficulty in handling because of the higher viscosity or (ii) insufficient adhesion of the cured substance because of the higher glass transition temperature of the composition. The oxetane compound of the present invention preferably has 1 to 4 oxetane rings.

The ink composition of the present invention preferably contains a compound having an oxetane ring together with a compound having an oxirane ring. The compound having an oxirane ring is not specifically limited and preferably is a compound selected from the group of: (i) a compound represented by Formula (1); (ii) a compound represented by Formula (2); (iii) α-pinene oxide; (iv) 1,2:8,9-diepoxylimonene; (v) epoxidized vegetable oil containing an unsaturated bond in the molecule; and (vi) a compound represented by Formula (A).

Compounds having an oxirane ring preferably used in the present invention will be described below.

First of all, compounds having an oxirane ring represented by Formula (1) will be explained.

In Formula (1), $R_1$ represent an substituted or unsubstituted alkyl group having 1 to 10 carbon atoms (for example, a methyl group which may be substituted, an ethyl group, a propyl group, a butyl group, an isopropyl group, a t-butyl group, a hexyl group, 2-ethylhexyl group, and a benzyl group; a substituted or unsubstituted aromatic group (for example, a phenyl group and a naphthyl group); or a substituted or unsubstituted acyl group (for example, a benzoyl group, a methacryl and a stearyl group). Of these, an alkyl group is preferably used.

Specific examples of the compounds represented by Formula (1) will be given below, however, the present invention is not limited thereto:

EPA-1

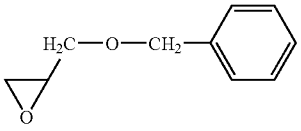

EPA-2

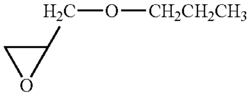

EPA-3

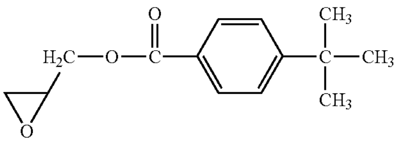

EPA-4

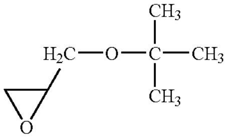

EPA-5

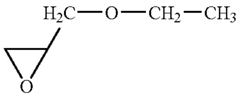

EPA-6

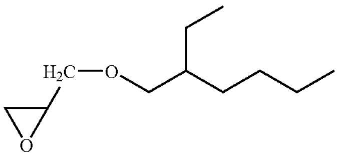

EPA-7

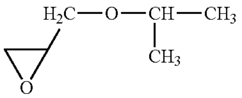

-continued

EPA-8

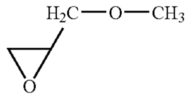

EPA-9

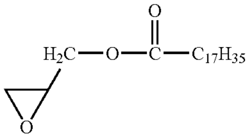

Next, the compounds having an oxirane ring represented by Formula (2) will be explained.

In Formula (2), $Y_1$ to $Y_8$ each independently represent: a hydrogen atom; a substituted or unsubstituted alkyl group (for example, a methyl, an ethyl group, a propyl group, a butyl group, an isopropyl group, a t-butyl group, a hexyl group, 2-ethylhexyl group, and a benzyl group); a substituted or unsubstituted carbonyl group (for example, an acetyl group and a benzoyl group); or an ether group (for example, an alkyl ether group and an aryl ether group).

Preferable examples of compounds having an oxirane ring represented by Formula (2) include the compounds represented by Formulae (III) and (IV).

Formula (III)

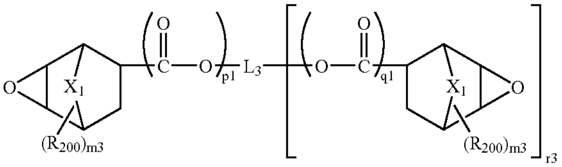

In Formula (III), $R_{200}$ represents an aliphatic group substituted at any position except for α- and β-positions of the oxirane ring, m3 represents an integer of 0 to 2, $X_1$ represents $-(CH_2)_{n0}-$ or $-(O)_{n0}-$, n0 represents 0 or 1, p1 and q1 each represents 0 or 1 which are not simultaneously 0, r3 represents an integer of 1 to 3, $L_3$ represents a single bond or a linking group having a branched structure of 1 to 15 carbon atoms and a valence of r3+1, which may have an oxygen atom or a sulfur atom in the main chain of the linking group.

Formula (IV)

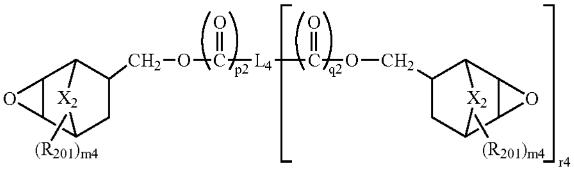

In Formula (IV), $R_{201}$ represents an aliphatic group substituted at any position except for α- and β-positions of the oxirane ring, m4 represents an integer of 0 to 2, $X_2$ represents $-(CH_2)_{n1}-$ or $-(O)_{n1}-$, n1 represents 0 or 1, p2 and q2 each represents 0 or 1 which are not simultaneously 0, r4 represents an integer of 1 to 3, $L_4$ represents a single bond or a linking group having a branched structure of 1 to 15 carbon atoms and a valence of r4+1, which may have an oxygen atom or a sulfur atom in the main chain of the linking group.

The compounds having an oxirane ring represented by Formula (III) and Formula (IV) will be detailed below.

In Formula (III), $R_{200}$ represents an aliphatic group substituted at any position except for α- and β-positions of the oxirane ring. Examples of the aliphatic group include: an alkyl group having 1 to 6 carbon atoms (for example, a methyl group, an ethyl group, a propyl group, an isopropyl group and a butyl group); a cycloalkyl group having 3-6 carbon atoms (for example, a cyclopropyl group, a cyclobutyl group, a cyclopentyl group and a cyclohexyl group); an alkenyl group having 1 to 6 carbon atoms (for example, a vinyl group, a 1-propenyl group, a 2-propenyl group and a 2-butenyl group); and an alkynyl group having 1 to 6 carbon atoms (for example, an acetylenyl group, a 1-propynyl group, a 2-propynyl group and a 2-butyny group). Of these, an alkyl group having 1 to 3 carbon atoms is preferably used and a methyl group or an ethyl group is more preferably used.

m3 represents an integer of 0 to 2 and preferably 1 or 2, $X_1$ represents $-(CH_2)_{n0}-$ or $-(O)_{n0}-$, n0 represents 0 or 1. When n0 is 0, it means that $X_1$ does not exist, and it is preferable that m3+n0 is one or more. $L_3$ represents a single bond or a linking group having a branched structure of 1 to 15 carbon atoms and a valence of r3+1, which may have an oxygen atom or a sulfur atom in the main chain of the linking group. p1 and q1 each represents 0 or 1 which are not simultaneously 0. r3 represents an integer of 1 to 3.

The compounds represented by Formula (IV) having an oxirane ring will now be explained.

In Formula (IV), $R_{201}$ represents an aliphatic group existing at any position except for α- and β-positions of the oxirane ring. Examples of the aliphatic group include: an alkyl group having 1 to 6 carbon atoms (for example, a methyl group, an ethyl group, a propyl group, an isopropyl group and a butyl group); a cycloalkyl group having 3-6 carbon atoms (for example, a cyclopropyl group, a cyclobutyl group, a cyclopentyl group and a cyclohexyl group); an alkenyl group having 1 to 6 carbon atoms (for example, a vinyl group, a 1-propenyl group, a 2-propenyl group and a 2-butenyl group); and an alkynyl group having 1 to 6 carbon atoms (for example, an acetylenyl group, a 1-propynyl group, a 2-propynyl group and a 2-butyny group). Of these, an alkyl group having 1 to 3 carbon atoms is preferably used and a methyl group or an ethyl group is more preferably used.

m4 represents an integer of 0 to 2 and preferably 1 or 2, $X_2$ represents $-(CH_2)_{n1}-$ or $-(O)_{n1}-$, and n1 represents 0 or 1. When n1 is 0, it means that $X_2$ does not exist, and it is preferable that m4+n1 is one or more. p2 and q2 each represents 0 or 1 which are not simultaneously 0. r4 represents an integer of 1 to 3.

$L_4$ represents a single bond or a linking group having a branched structure of 1 to 15 carbon atoms and a valence of r4+1, which may have an oxygen atom or a sulfur atom in the main chain of the linking group.

As for the compounds represented by Formulae (III) and (IV), examples of a divalent linking group having 1 to 15 carbon atoms, which may have an oxygen atom or a sulfur atom in the main chain include: the groups listed below and combined groups thereof with a plurality of $-O-$, $-S-$, $-CO-$ and $-CS-$ groups.

an ethylidene group: $>CHCH_3$;

an isopropylidene group: $>C(CH_3)_2$;

a 2,2-dimethyl-1,3-propanediyl group: $-CH_2C(CH_3)_2CH_2-$;

a 2,2-dimethoxy-1,3-propanediyl group: $-CH_2C(OCH_3)_2CH_2-$;

a 2,2-dimethoxymethyl-1,3-propanediyl group: $-CH_2C(CH_2OCH_3)_2CH_2-$;

a 1-methyl-1,3-propanediyl group: $-CH(CH_3)CH_2CH_2-$;

a 1,4-dimethyl-3-oxa-1,5-pentanediyl group: $-CH(CH_3)CH_2OCH(CH_3)CH_2-$;

a 1,4,7-trimethyl-3,6-dioxa-1,8-octanediyl group: $-CH(CH_3)CH_2OCH(CH_3)CH_2OCH(CH_3)CH_2-$;

a 5,5-dimethyl-3,7-dioxa-1,9-nonanediyl group: $-CH_2CH_2OCH_2C(CH_3)_2CH_2OCH_2CH_2-$;

a 5,5-dimethoxy-3,7-dioxa-1,9-nonanediyl group: $-CH_2CH_2OCH_2C(OCH_3)_2CH_2OCH_2CH_2-$;

a 5,5-dimethoxymethyl-3,7-dioxa-1,9-nonanediyl group: $-CH_2CH_2OCH_2C(CH_2OCH_3)_2CH_2OCH_2CH_2-$; and an isopropylidenebis-p-phenylene group: $-p-C_6H_4-C(CH_3)_2-p-C_6H_4-$.

Linking groups of trivalent or more include: (i) groups prepared by removing required number of hydrogen atoms at any positions of the divalent linking groups listed above; and (ii) combined groups of the groups described in (i) with a pluarily of $-O-$, $-S-$, $-CO-$ and $-CS-$ groups.

$L_3$ and $L_4$ may have a substituent. Examples of the substituent include: halogen atoms (for example, a chlorine atom, a bromine atom and a fluorine atom); alkyl groups having 1 to 6 carbon atoms (for example, a methyl group, an ethyl group, a propyl group, an isopropyl group and a butyl group); alkoxy groups having 1-6 carbon atoms (for example, a methoxy group, an ethoxy group, an n-propoxy group, an iso-propoxy group, an n-butoxy group and a tert-butoxy group); acyl groups (for example, an acetyl group, a propionyl group and a trifluoroacetyl group); acyloxy groups (for example, an acetoxy group, a propionyloxy group and a trifluoroacetoxy group); and alkoxycarbonyl groups (a methoxycarbonyl group, an ethoxycarbonyl group and a tert-butoxycarbonyl group). Among these, halogen atoms, alkyl groups, and alkoxy groups are preferable as a substituent.

Specific examples of the compounds having an epoxy group represented by Formula (2) are shown below, however, the present invention is not limited thereto.

EPB-1

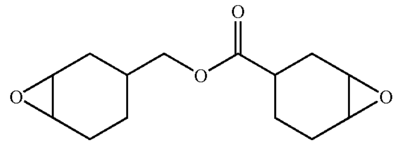

EPB-2

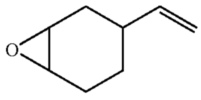

EPB-3

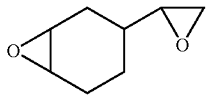

EPB-4

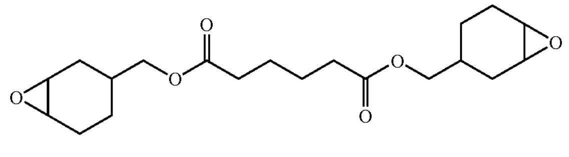

-continued

EPB-5

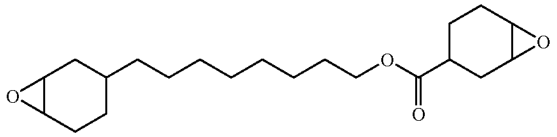

EPD-1

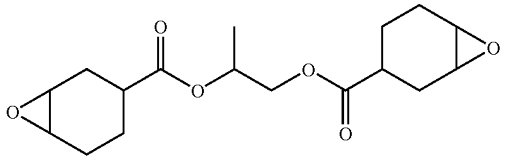

EPD-2

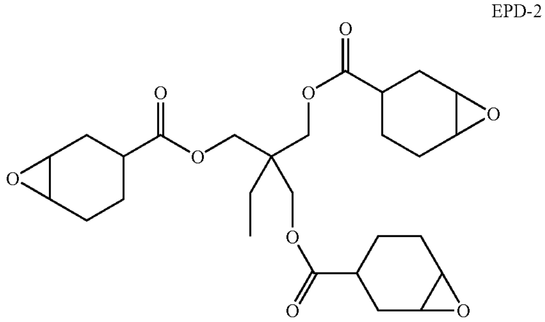

EPD-3

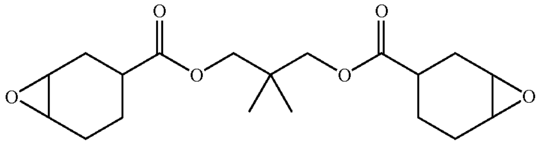

EPD-4

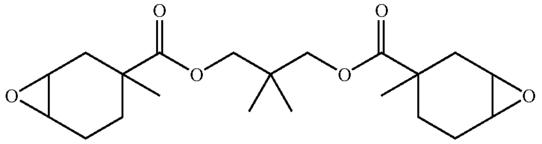

EPD-5

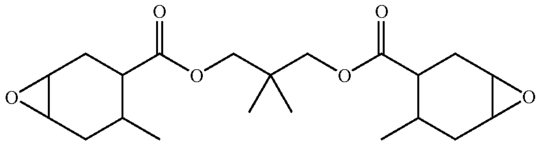

EPD-6

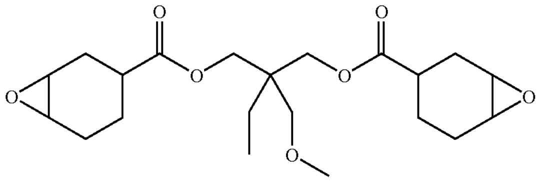

EPD-7

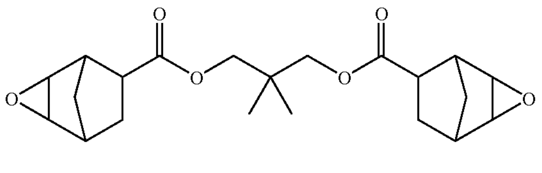

-continued

EPD-8

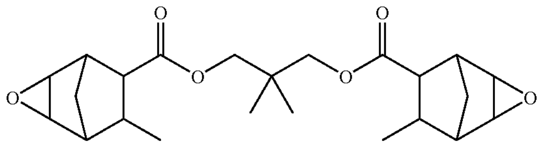

EPD-9

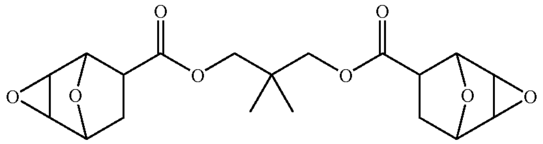

Examples of epoxidized vegetable oil usable in the present invention include epoxidized vegetable oil having an unsaturated bond of, for example: olive oil, safflower oil, sunflower oil, soybean oil, and linseed oil. Commercialized epoxidized vegetable oils are also usable, for example: Sansocizer E-4030 (produced by New Japan Chemical Co., Ltd.) and Atofina Chemical: Vf7010, Vf9010 and Vf9040.

The compounds having an oxirane ring represented by Formula (A) will be explained.

In Formula (A), $R_{100}$ represents a substituent, examples of which include: halogen atoms (for example, a chlorine atom, a bromine atom and a fluorine atom); alkyl groups having 1 to 6 carbon atoms (for example, a methyl group, an ethyl group, a propyl group, an isopropyl group and a butyl group); alkoxy groups having 1-6 carbon atoms (for example, a methoxy group, an ethoxy group, an n-propoxy group, an iso-propoxy group, an n-butoxy group and a tert-butoxy group); acyl groups (for example, an acetyl group, a propionyl group and a trifluoroacetyl group); acyloxy groups (for example, an acetoxy group, a propionyloxy group and a trifluoroacetoxy group); and alkoxycarbonyl groups (a methoxycarbonyl group, an ethoxycarbonyl group and a tert-butoxycarbonyl group). Among these, alkyl groups, alkoxy groups and alkoxycarbonyl groups are preferable as a substituent. m0 represents an integer of 0 to 2 and preferably 0 or 1. r0 represents an integer of 1 to 3. $L_0$ represents a single bond or a linking group having a branched structure of 1 to 15 carbon atoms and a valence of r0+1, which may have an oxygen atom or a sulfur atom in the main chain of the linking group.

The compound having an,oxirane ring represented by Formula (A) is preferably an alicyclic epoxide represented by Formula (I) or Formula (II).

Formula (I)

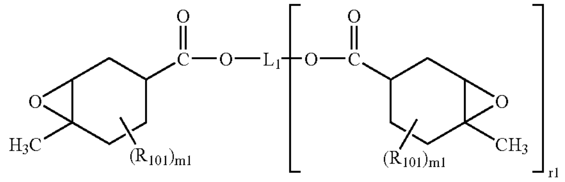

In Formula (I), $R_{101}$ represents a substituent, m1 represents an integer of 0 to 2, r1 represents an integer of 1 to 3 and $L_1$ represents a single bond or a linking group having 1 to 15 carbon atoms and a valence of r1+1, which may have an oxygen atom or a sulfur atom in the main chain of the linking group.

Formula (II)

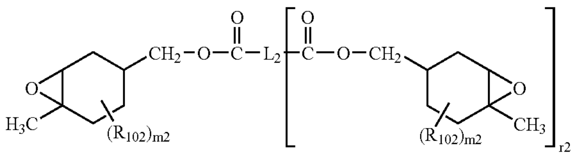

In Formula (II), $R_{102}$ represents a substituent, m2 represents an integer of 0 to 2, r2 represents an integer of 1 to 3 and $L_2$ represents a single bond or a linking group having 1 to 15 carbon atoms and a valence of r2+1, which may have an oxygen atom or a sulfur atom in the main chain of the linking group.

In the compounds represented by Formula (I) and Formula (II), $R_{101}$ and $R_{102}$ each represents a substituent examples of which include halogen atoms (for example, a chlorine atom, a bromine atom and a fluorine atom); alkyl groups having 1 to 6 carbon atoms (for example, a methyl group, an ethyl group, a propyl group, an isopropyl group and a butyl group); alkoxy groups having 1-6 carbon atoms (for example, a methoxy group, an ethoxy group, an n-propoxy group, an iso-propoxy group, an n-butoxy group and a tert-butoxy group); acyl groups (for example, an acetyl group, a propionyl group and a trifluoroacetyl group); acyloxy groups (for example, an acetoxy group, a propionyloxy group and a trifluoroacetoxy group); and alkoxycarbonyl groups (a methoxycarbonyl group, an ethoxycarbonyl group and a tert-butoxycarbonyl group). Among these, alkyl groups, alkoxy groups and alkoxycarbonyl groups are preferable as a substituent.

m1 and m2 each represents an integer of 0 to 2 and preferably 0 or 1.

$L_1$ represents a single bond or a linking group having 1 to 15 carbon atoms and a valence of r1+1, which may have an oxygen atom or a sulfur atom in the main chain of the linking group and $L_2$ represents a single bond or a linking group having 1 to 15 carbon atoms and a valence of r2+1, which may have an oxygen atom or a sulfur atom in the main chain of the linking group.

Examples of divalent linking groups having 1 to 15 carbon atoms represented by L1, L2 and L3 in Formula (A), Formula (I) and Formula (II), which may have an oxygen atom or a sulfur atom in the main chain include the groups listed below and combined groups thereof with a plurality of —O—, —S—, —CO— and —CS— groups.

a methylene group: $—CH_2—$;
an ethylidene group: $>CHCH_3$;
an isopropylidene group: $>C(CH_3)_2$;
a 1,2-ethylene group: $—CH_2CH_2—$;
a 1,2-propylene group: $—CH(CH_3)CH_2—$;
a 1, 3-propanediyl group: $—CH_2CH_2CH_2—$;
a 2,2-dimethyl-1,3-propanediyl group: $—CH_2C(CH_3)_2CH_2—$;
a 2,2-dimethoxy-1,3-propanediyl group: $—CH_2C(OCH_3)_2CH_2—$;
a 2,2-dimethoxymethyl-1,3-propanediyl group: $—CH_2C(CH_2OCH_3)_2CH_2—$;
a 1-methyl-1,3-propanediyl group: $—CH(CH_3)CH_2CH_2—$;
a 1,4-butanediyl group: $—CH_2CH_2CH_2CH_2—$;
a 1,5-pentanediyl group: $—CH_2CH_2CH_2CH_2CH_2—$;
an oxydiethylene group: $—CH_2CH_2OCH_2CH_2—$;
a thiodiethylene group: $—CH_2CH_2SCH_2CH_2—$;
a 3-oxothiodiethylene group: $—CH_2CH_2SOCH_2CH_2—$;
a 3,3-dioxothiodiethylene group: $—CH_2CH_2\ SO_2\ CH_2CH_2—$;
a 1,4-dimethyl-3-oxa-1,5-pentanediyl group: $—CH(CH_3)CH_2OCH(CH_3)CH_2—$;
a 3-oxopentanediyl group: $—CH_2CH_2COCH_2CH_2—$;
a 1,5-dioxo-3-oxapentanediyl group: $—COCH_2OCH_2CO—$;
a 4-oxa-1,7-heptanediyl group: $—CH_2CH_2CH_2OCH_2CH_2CH_2—$;
a 3,6-dioxa-1,8-octanediyl group: $—CH_2CH_2OCH_2CH_2OCH_2CH_2—$;
a 1,4,7-trimethyl-3,6-dioxa-1,8-octanediyl group: $—CH(CH_3)CH_2OCH(CH_3)CH_2OCH(CH_3)CH_2—$;
a 5,5-dimethyl-3,7-dioxa-1,9-nonanediyl group: $—CH_2CH_2OCH_2C(CH_3)_2CH_2OCH_2CH_2—$;
a 5,5-dimethoxy-3,7-dioxa-1,9-nonanediyl group: $—CH_2CH_2OCH_2C(OCH_3)_2CH_2OCH_2CH_2—$;
a 5,5-dimethoxymethyl-3,7-dioxa-1,9-nonanediyl group: $—CH_2CH_2OCH_2C(CH_2OCH_3)_2CH_2OCH_2CH_2—$;
a 4,7-dioxo-3,8-dioxa-1,10-decanediyl group: $—CH_2CH_2O—CO\ CH_2CH_2CO—O\ CH_2CH_2—$;
a 3,8-dioxo-4,7-dioxa-1,10-decanediyl group: $—CH_2CH_2CO—O\ CH_2CH_2O—CO\ CH_2CH_2—$;
a 1,3-cyclopentanediyl group: $-1,3-C_5H_8—$;
a 1,2-cyclohexanediyl group: $-1,2-C_6H_{10}—$;
a 1,3-cyclohexanediyl group: $-1,3-C_6H_{10}—$;
a 1,4-cyclohexanediyl group: $-1,4-C_6H_{10}—$;
a 2,5-tetrahydrofurandiyl group: $2,5-C_4H_6O—$;
a p-phenylene group: $-p-C_6H_4—$;
a m-phenylene group: $-m-C_6H_4—$;
an α,α'-o-xylylene group: $-o-CH_2—C_6H_4—CH_2—$;
an α,α'-m-xylylene group: $-m-CH_2—C_6H_4—CH_2—$;
an α,α'-p-xylylene group: $-p-CH_2—C_6H_4—CH_2—$;
a furan-2,5-diyl-bismethylene group: $2,5-CH_2—C_4H_2O—CH_2—$;
a thiophene-2,5-diyl-bismethylene group: $2,5-CH_2—C_4H_2S—CH_2—$; and
an isopropylidenebis-p-phenylene group: $-p-C_6H_4—C(CH_3)_2-p-C_6H_4—$.

Linking groups of trivalent or more include: (i) groups prepared by removing required number of hydrogen atoms at any positions of the divalent linking groups listed above; and (ii) combined groups of the groups described in (i) with a plurality of —O—, —S—, —CO— and —CS— groups.

$L_0$, $L_1$ and $L_2$ may have a substituent, example of which include: halogen atoms (for example, a chlorine atom, a bromine atom and a fluorine atom); alkyl groups having 1 to 6 carbon atoms (for example, a methyl group, an ethyl group, a propyl group, an isopropyl group and a butyl group); alkoxy groups having 1-6 carbon atoms (for example, a methoxy group, an ethoxy group, an n-propoxy group, an iso-propoxy group, an n-butoxy group and a tert-butoxy group); acyl groups (for example, an acetyl group, a propionyl group and a trifluoroacetyl group); acyloxy groups (for example, an acetoxy group, a propionyloxy group and a trifluoroacetoxy group); and alkoxycarbonyl groups (a methoxycarbonyl group, an ethoxycarbonyl group and a tert-butoxycarbonyl group). Among these, alkyl groups, alkoxy groups and alkoxycarbonyl groups are preferable as a substituent.

Each of $L_0$, $L_1$ and $L_2$ is preferably a divalent linking group having 1 to 8 carbon atoms, which may have an oxygen atom or a sulfur atom in the main chain of the linking group, and more preferably a divalent linking group having 1 to 5 carbon atoms, of which main chain contains only carbon atoms.

Preferable examples of the alicyclic epoxide represented by Formula (A), however, the present invention is not limited thereto.

| | | |
|---|---|---|
| EPC-1 | 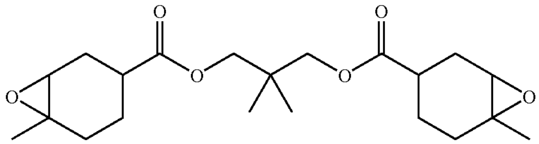 | Molecular weight: 380.48 |
| EPC-2 | 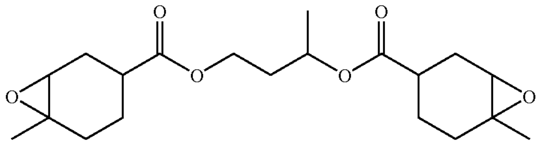 | Molecular weight: 366.45 |
| EPC-3 | 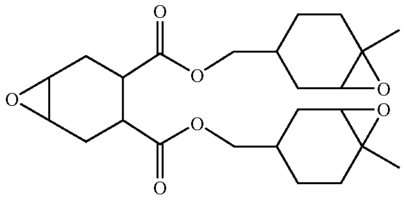 | Molecular weight: 434.52 |
| EPC-4 | 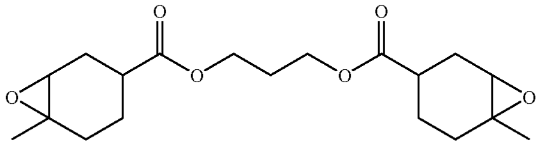 | Molecular weight: 352.42 |
| EPC-5 | 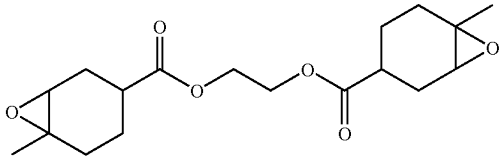 | Molecular weight: 338.40 |
| EPC-6 | 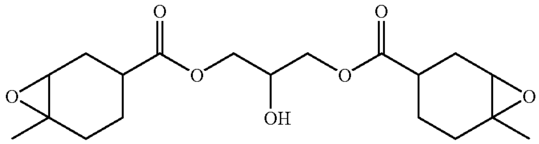 | Molecular weight: 380.48 |
| EPC-7 | 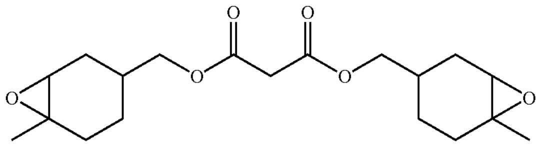 | Molecular weight: 352.42 |
| EPC-8 | 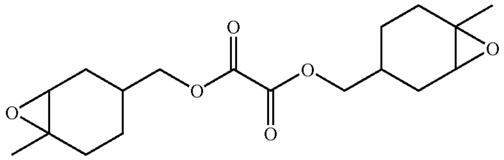 | Molecular weight: 338.40 |
| EPC-9 | 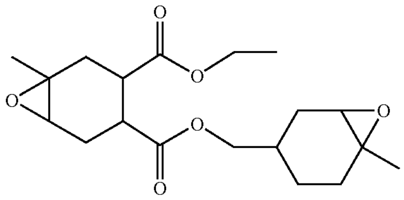 | Molecular weight: 352.42 |

-continued

EPC-10

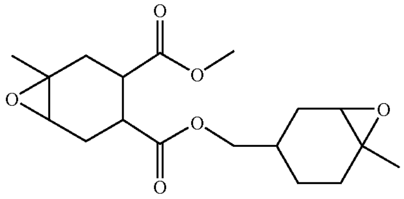

Molecular weight: 338.4

EPC-11

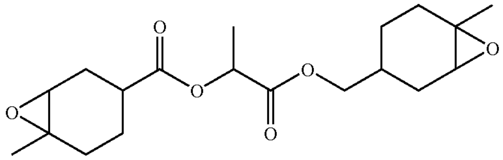

Molecular weight: 352.42

The amount of the compound having an oxirane ring added to the composition of the present invention is preferably 10 to 80% by weight. When the amount is less than 10%, the curability becomes largely influenced by environmental conditions (temperature and moisture) and the composition becomes difficult to be used. Contrary, when it exceeds 80%, the physical strength of the cured substance becomes too weak. In the present invention, the compounds containing oxirane rings may be used alone or in combinations of other kinds.

The preparation method of the compound having an oxirane ring is not specifically limited, however, it may be synthesized according to, for example: (i) $4^{th}$ Edition Shin Jikken-kagaku Koza 20 (Organic synthesys II), Ed by Chemical Society of Japan, Maruzen, Tokyo, 213-(1992); (ii) The chemistry of heterocyclic compounds-Small Ring Heterocycles part 3, Oxiranes, ed. by Alfred Hasfner, John & Wiley and Sons, An Interscience Publication, New York, (1985); (iii) Yoshimura, Settyaku, 29(12), 32 (1985); (iv) Yoshimura, Settyaku, 30(5), 42 (1986); (v) Yoshimura, Settyaku, 30(7), 42 (1986); (vi) JP-A No. 11-100378; (vii) Japanese Pat. No. 2906245; and (viii) Japanese Pat. No. 2926262.

One of the characteristic feature of the present invention is to use a photo acid generator. Any photo acid generators known in the prior art are usable in the present invention.

As the photo acid generator, for example, a chemical amplification type photo resist or compound used for the photo cationic polymerization is used (Organic electronics material seminar "Organic material for imaging" from Bunshin publishing house (1993), refer to page 187-192). Examples preferable for the present invention will be listed below.

Firstly, aromatic onium compound $B(C_6F_5)_4^-$, $PF_6^-$, $ASF_6^-$, $SbF_6^-$, $CF_3SO_3^-$ salt, such as diazonium, ammonium, iodonium, sulfonium, phosphonium, can be listed.

Specific examples of the onium compounds usable in the present invention will be shown below.

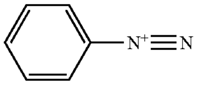

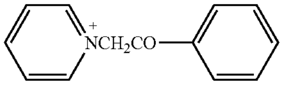

-continued

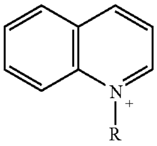

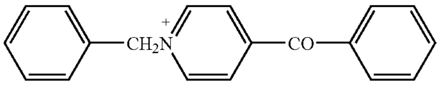

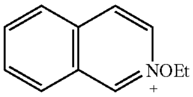

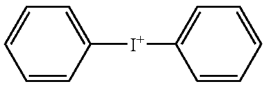

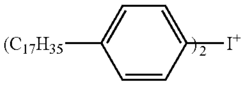

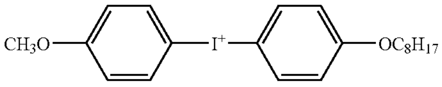

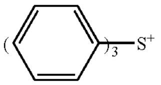

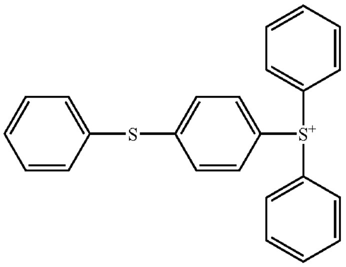

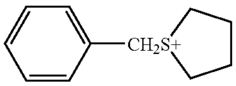

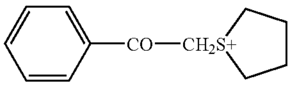

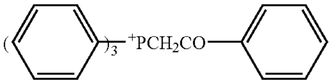

$Ph_3\overset{+}{P}CH_2CN$

Secondly, sulfone compounds, which generate sulfonic acid, can be listed. Examples of specific compounds will be shown below.

-continued

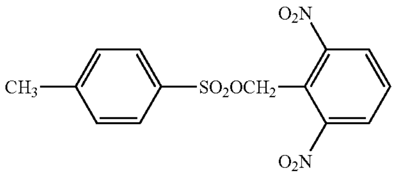
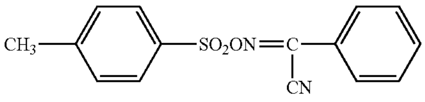
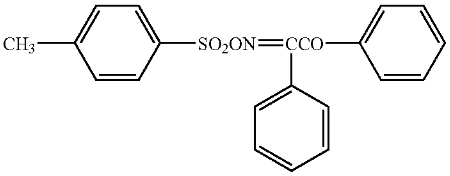
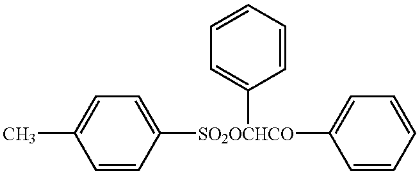
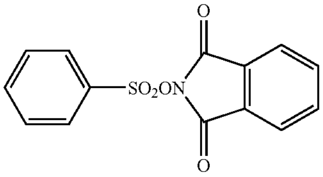
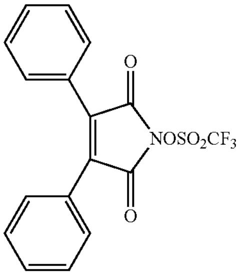
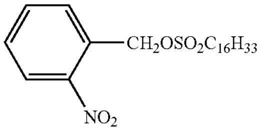
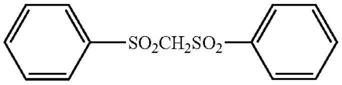
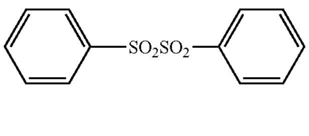
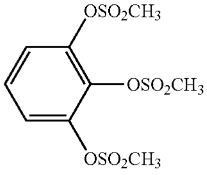

Thirdly, halogenide which generates hydrogen halide can also be used. Examples of specific compounds will be shown below.

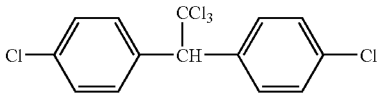
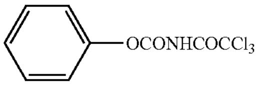
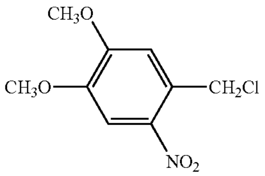
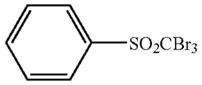
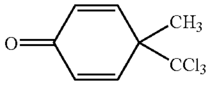
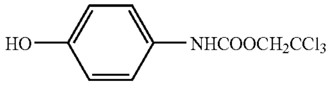
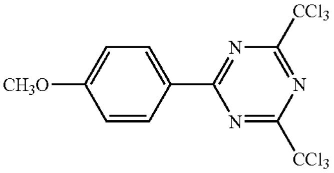

Fourthly, iron allene complex can be listed.

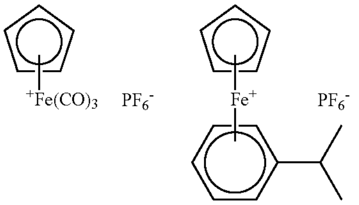

Sulfonium salts represented by Formulae [1] to [4], which do not generate benzene under irradiation of actinic rays, are preferably used in the composition of the present invention. A compound which contains a benzene ring having a substituent and being bound to $S^+$ is included in the above mentioned compounds.

Formula [1]

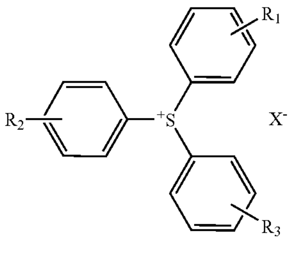

Formula [2]

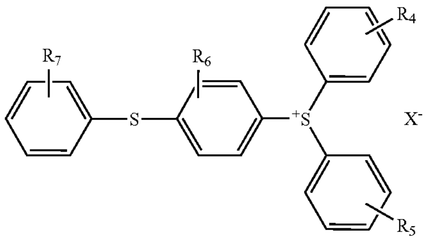

-continued

Formula [3]

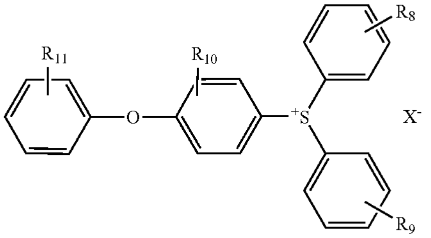

Formula [4]

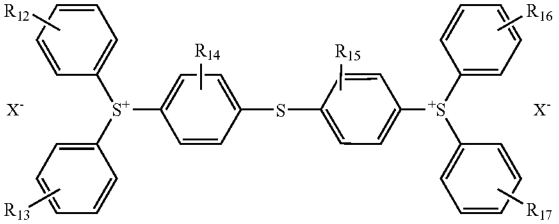

In the above Formulae [1] to [4], $R_1$ through $R_{17}$ independently represent a hydrogen atom or a substituent, provided that $R_1$ through $R_3$ are not simultaneously hydrogen atoms, $R_4$ through $R_7$ are not simultaneously hydrogen atoms, $R_8$ through $R_{11}$ are not simultaneously hydrogen atoms, and $R_{12}$ through $R_{17}$ are not simultaneously hydrogen atoms.

Examples of the substituents represented by $R_1$ through $R_{17}$ include an alkyl group such as a methyl group, an ethyl group, a propyl group, an isopropyl group, a butyl group, an isobutyl group, a t-butyl group, a pentyl group, or a hexyl group; an alkoxy group such as a methoxy group, an ethoxy group, a propoxy group, an isopropyl group, a butoxy group, a hexyloxy group, a decyloxy group or a dodecyloxy group; a carbonyl group such as an acetoxy group, a propionyloxy group, a decylcarbonyloxy group, a dodecylcarbonyloxy group, a methoxycarbonyl group, an ethoxycarbonyl group or a benzoyloxy group; a phenylthio group; a halogen atom such as fluorine, chlorine, bromine or iodine; a cyano group; a nitro group; and a hydroxyl group.

X represents a non-nucleophilic anion residue. Examples thereof include a halogen atom such as F, Cl, Br or I, $B(C_6F_5)_4$, $R_{18}COO$, $R_{19}SO_3$, $SbF_6$, $AsF_6$, $PF_6$, and $BF_4$ in which $R_{18}$ and $R_{19}$ independendly represent an alkyl group such as a methyl group, an ethyl group, a propyl group or a butyl group; an alkyl group having, as a substituent, a halogen atom such as fluorine, chlorine, bromine or iodine, a nitro group, a cyano group, a methoxy group or an ethoxy group; or a phenyl group. Among these, $B(C_6F_5)_4^-$ and $PF_6^-$ are preferred in regard to operation safety.

The above described compounds are easily synthesized using commonly known methods, for example, in the same manner as the method to prepare a photo-acid generator described in The Chemical Society of Japan, Vol. 71, No. 11 (1998) or in "Organic Materials for Imaging" edited by The Japanese Research Association for Organic Electronics Materials (1993), Bun-Shin Publishing.

In the present invention, it is specifically preferable that any one of the sulfonium salts represented by Formulae [1] to [4] is one of the sulfonium salts represented by the following Formulae [5] to [13]

Formula [5]

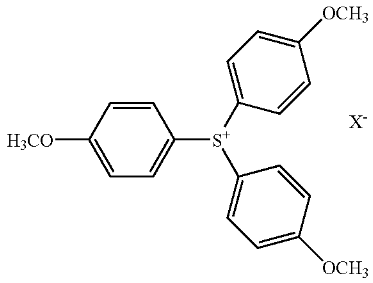

Formula [6]

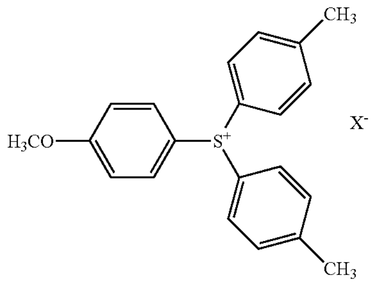

Formula [7]

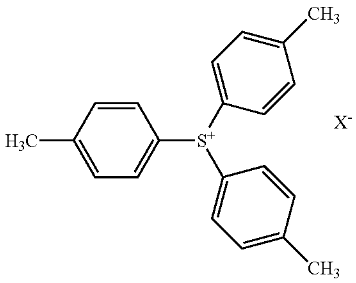

Formula [8]

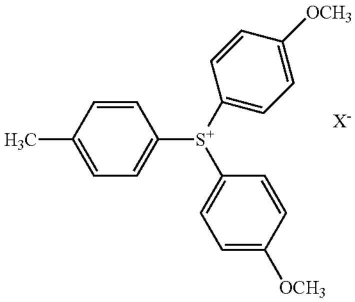

Formula [9]

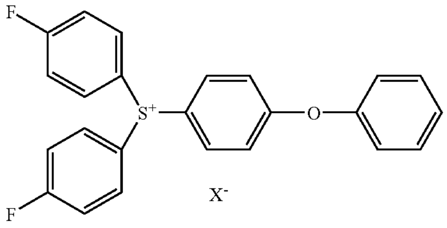

-continued

Formula [10]

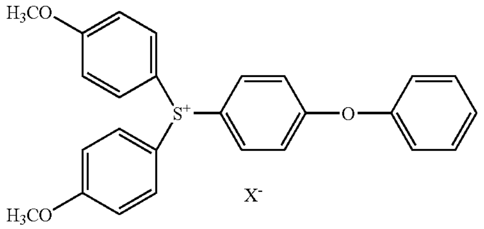

Formula [11]

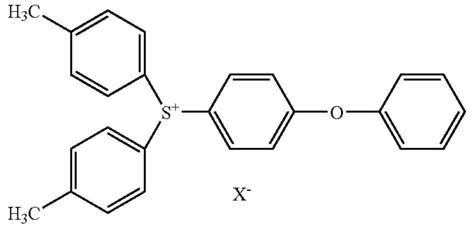

Formula [12]

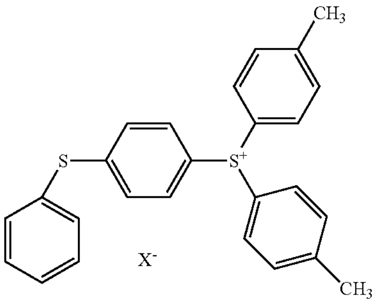

Formula [13]

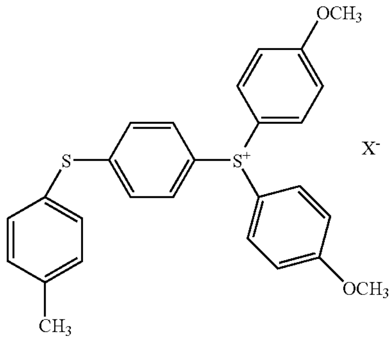

As described above, one of the characteristic features of the cationically polymerizable composition of the present invention is to use a phthalocyanine derivative together with a phthalocyanine pigment or a carbon black pigment, a dispersant, a cationically polymerizable monomer and a photo acid generator.

A cationically polymerizable monomer is a non-polar solvent, however, it also contains groups which play an important role in the polymerization reaction induced by irradiation of actinic rays. Accordingly, stable dispersion of pigment is rather difficult because polar and non-polar interactions coexist in the monomer. One method to attain sufficient dispersion stability is to increase the amount of dispersant in the solution because a phthalocyanine pigment or a carbon black pigment is absorbed by the dispersant via polar interaction. However, increase of dispersant means increase of the number of polar groups which trap the generated acid by the irradiation of actinic rays, which may deteriorate the curability of the monomer. Alternatively, a phthalocyanine derivative works as a dispersion aid, namely, a synergist, and helps the absorption of a phthalocyanine pigment or a carbon black pigment to the dispersant whereby stable dispersion of the pigment is attained without deteriorating the curability.

The phthalocyanine derivative used in the present invention is prepared by known methods, for example, the method to react with concentrated sulfuric acid and the methods disclosed in JP-A Nos. 59-168070, 53-85823 and 2000-513396, and Examined Japanese Patent Publications No. 7-2911.

As the phthalocyanine derivatives used in the present invention, copper-phthalocyanine compounds represented by the following Formulae (B) to (D) are listed.

$CuPc\text{-}(SO_3H)_n$ Formula (B)

In Formula (B), Pc represents phthalocyanine and n represents an integer of 1 to 4.

$CuPc\text{-}(X—NR^1R^2)_n$ Formula (C)

In Formula (C), Pc represents phthalocyanine, X represents a divalent linking group, $R^1$ and $R^2$ each independently represents an alkyl group, $R^1$ and $R^2$ may be combined to form a ring which may contain a hetero atom and n represents an integer of 1 to 4.

Examples of X include: $—SO_2—$, —CO— and $—CH_2—$ groups.

Examples of $R^1$ and $R^2$ include: a methyl group, an ethyl group, a piperidinomethyl group, a dimethylaminomethyl group, a diethylaminoethyl group, a dimethylaminopropyl group, a diethylaminopropyl group, a dibutylaminopropyl group, a piperidinoethyl group, a morpholinoethyl group, a piperidinopropyl group, a diethylaminohexyl group, a diethylaminoethoxypropyl group, a diethylaminobutyl group, a dimethylaminoamyl group, 2-ethylhexylaminoethyl group, a stearylaminoethyl group, an oleylaminoethyl group, a p-dimethylaminoethylsulfamoylphenyl group, a p-diethylaminoethylsulfamoylphenyl group, a p-dimethylaminopropylsulfamoylphenyl group, and a p-diethylaminoethylcarbamoylphenyl group.

$CuPc\text{-}(N═N\text{-}Ph\text{-}Z)_n$ Formula (D)

In Formula (D), Pc represents phthalocyanine, Ph represents a phenyl group, and Z represents an amino group, a carboxylic acid group or its salt, a sulfonic acid group or its salt, a carbamoyl group which may be substituted, or a sulfamoyl group which may be substituted.

Examples of Z include an amino group which may be substituted (for example, an amino group, a methylamino group, an ethylamino group, a dimethylamino group, a diethylamino group and a 2-ethylhexylamino group), an anilino group, a carboxylic acid or its salt, a sulfonic acid or its salt, a carbamoyl group, a methylcarbamoyl group, a dimethylcarbamoyl group, an ethylcarbamoyl group, a diethylcarbamoyl group, a sulfamoyl group, a methylsulfamoyl group, an ethylsulfamoyl group, a dimethylsulfamoyl group and a diethylsulfamoyl group.

The phthalocyanine derivative may be added into the cationically polymerizable composition of the present invention when the composition is dispersed or, alternatively, it is also possible that a phthalocyanine pigment or a carbon black pigment is added in a solution in which a phthalocyanine derivative is dissolved in a solvent, followed by removing the solvent to form a treated phthalocyanine pigment or a treated carbon black pigment.

The amount of a phthalocyanine derivative is preferably 0.5 to 20% by weight and more preferably 1 to 5% by weight based on the weight of a phthalocyanine pigment or a carbon black pigment. When the amount of the phthalocyanine derivative is less than 0.5%, the desired effect of the present invention is not obtained, and when it is more than 20%, the phthalocyanine derivative behaves as a monomolecular dye, resulting in degradation of the hardness of the cured substance.

The viscosity of the composition of the present invention at 25° C. is preferably 7 to 50 mpa·s to obtain stable ejection from the ink-jet head and excellent curability regardless of the environmental conditions (for example, temperature and moisture).

Various kinds of additives other than those above described may be contained in the composition of the present invention. For example, a surfactant, a leveling additive, a matting agent, a polyester type resin, a polyurethane type resin, a vinyl type resin, an acryl type resin, a rubber type resin and wax series can be added to the composition. In order to improve the storage stability, known various basic compounds may be used. Typical examples thereof include a basic alkali metal compound, a basic alkali earth metal compound, and a basic organic compound such as an amine. A radical polymerizable monomer and an initiator may also be mixed to form a radical-cationic hybrid type polymerizable composition.

Basic compounds may also be added to the actinic ray curable composition of the present invention. Addition of a basic compound may results in excellent ejection stability and prevention of wrinkles due to shrinkage even under a low moisture environment. As the basic compound, the various known basic compounds may be used. Typical examples thereof include basic alkali metal compounds, basic alkali earth metal compounds, and basic organic compounds, such as an amine.

As the basic alkali metal compounds, listed are alkali metal hydroxides (such as lithium hydroxide, sodium hydroxide and potassium hydroxide), alkali metal carbonates (such as lithium carbonate, sodium carbonate and potassium carbonate), and alkali metal alcoholates (such as sodium methoxide, sodium ethoxide, potassium methoxide and potassium ethoxide).

As the basic alkaline earth metal compounds, listed are alkaline earth metal hydroxides (such as magnesium hydroxide and calcium hydroxide), alkaline earth metal carbonates (such as magnesium carbonate and calcium carbonate), and alkaline earth metal alcoholates (such as magnesium methoxide).

As the basic organic compounds, listed are amines and nitrogen containing heterocyclic compounds such as quinoline and quinolizine. Of these, amines are preferable from the viewpoint of compatibility with a photopolymerizable monomer, for example, octylamine, naphthylamine, xylenediamine, dibenzylamine, diphenylamine, dibutylamine, trioctylamine, tetramethylethylenediamine, tetramethyl-1,6-hexamethylenediamine, hexamethylenetetramine, and triethanolamine.

The concentration of the basic compound is 10 to 1,000 ppm by weight, and preferably 20 to 500 ppm by weight, based on the total weight of the photopolymerizable monomer. The basic compound may be used alone or in combinations of a plurality thereof.

Water may also be added in order to prevent curing of the ink in the ink tank, plumbing, and head. The amount of added water is preferably 0.1% by weight or more and less than 8% by weight based on the total weight of the composition.

Recording material used in the present invention includes nonabsorbent plastics and those films, which are used for flexible packaging, besides ordinary non-coated and coated paper. Examples of plastic films include: polyethylene terephthalate (PET) film, oriented polystyrene (OPS) film, oriented polypropylen (OPP) film, oriented nylon (ONy) film, polyvinylchloride (PVC) film, polyethylene (PE) film, and triacetyl cellulose (TAC) film. Examples of other plastics include, polycarbonate, an acryl resin, ABS, polyacetal, PVA, and various kinds of rubber. The ink composition of the present invention is also applicable to metal and glass. The ink composition of the present invention effectively forms an image on films which is easily shrunk by heat, for example, PET film, OPS film, OPP film, ONy film, and PVC film, since these films easily curl or are transformed by shrinking of the ink or by the heat generated when the ink cures, accordingly, the image may be difficult to follow the transformation of these films.

Plastic films differ greatly in surface energy, and accordingly, there has been a problem in that the ink dot diameter after ink deposition on a recording material varies depending on the kind of recording material. The ink composition of the present invention forms a high resolution image on a wide range of recording materials having a surface energy from 35 to 60 mN/m, including a OPP or OPS film having a relatively low surface energy, and a PET film having a relatively high surface energy.

In the present invention, a long rolled web of a recording material is advantageously utilized with respect to a cost of recording material, for example, packaging cost and manufacturing cost, efficiency of print preparation and applicability to a variety of sheet sizes.

When a cyan color ink-jet ink using the actinic ray curable composition of the present invention is prepared, an ink-jet ink set which also contains ink-jet inks having other color pigments may be prepared. The ink-jet ink set preferably contains actinic ray curable ink colors of, at least, yellow, magenta, and black.

In order to form a picture image, dark-light graded color inks in which the amount of colorant are changed are preferably used. Special color inks of red, green, blue or white may also be used, if needed.

An image forming method of the invention will be detailed.

In the image forming method of the present invention, it is preferred that the ink composition of the present invention (hereafter merely referred to as an "ink") described above is ejected onto a recording material according to an ink jet recording method, and then cured by actinic ray irradiation, for example, UV rays.

(Thickness of Ink Layer Formed After Ink is Ejected Onto Recording Material)

In the present invention, the thickness of an ink layer, after ink has been ejected onto recording material and cured by actinic ray irradiation, is preferably from 2 to 25 μm. In actinic ray curable ink-jet recording in the field of screen printing, the thickness of the ink is at present over 25 μm. Ink ejection of an excessive layer thickness is not preferred in the field of flexible package printing where a thin plastic film is used as a recording material, because problems are caused in that stiffness and texture may change by such printing, in addition to the problems of the aforementioned curl and wrinkles of recording material.

Herein, the thickness of an ink layer refers to the maximum thickness of the ink layer deposited on the recording material. This is common to a single color ink layer, and an overlapped layer of two different color (secondary color) inks, three different color inks or four different color inks (including white ink as a base ink), which are formed on recording material according to an ink jet recording process.

(Conditions of Ink Ejection)

As conditions of ink ejection, ink ejection is preferably performed while a recording head and ink are heated to 35 to 100° C. with respect to ejection stability. An actinic ray curable ink shows a large viscosity variation depending on temperature, which in turn, significantly influences a liquid droplet size and a liquid droplet ejection rate resulting in deterioration of image quality. Accordingly, it is essential to keep an ink temperature constant after the ink temperature is raised. The control range of ink temperature is ±5° C. of the set temperature, preferably ±2° C. of the set temperature and furthermore preferably ±1° C. of the set temperature.

The droplet volume of the ink ejected from each ink nozzle is preferably 2 to 20 pl. The droplet volume of the ink is preferably in the range described above to form high resolution images, however, it is not an easy matter to stably eject droplets in this volume range. In the present invention, even when a small droplet volume such as 2 to 20 pl is ejected, ejection stability is maintained, resulting in high resolution images.

(Actinic Ray Irradiation Condition After Ink Has Been Ejected Onto Recording Material)

In the image recording method of the present invention, it is preferable that actinic rays are irradiated within 0.001 to 2.0 seconds after ink has been deposited on the recording material, and it is more preferable that actinic rays are irradiated within 0.001 to 1.0 second after ink has been deposited on recording material. Irradiation of actinic rays as early as possible after ejecting the ink is specifically important in order to form high resolution images.

An actinic ray irradiation method has been basically disclosed in JP-A No. 60-132767, in which light sources are provided at the both sides of a head unit where a head and a light are scanned in a shuttle system. Irradiation is performed in a certain time interval after ink has been deposited on the recording material. Further, curing is completed by another light source which is not driven. In U.S. Pat. No. 6,145,979, the following light irradiation methods have been disclosed: (i) a method utilizing optical fibers; and (ii) a method in which collimated light is reflected by a mirror provided on the side surface of a head unit, and UV light (ultraviolet light) is irradiated on the recording portion. In the image forming method of the present invention, any of these irradiation methods may be utilized.

Further, the following method is also preferable: irradiation of actinic rays is divided into two steps, (i) first actinic ray irradiation is 0.001 to 2.0 seconds after ink has been deposited on recording material by the above-described method; and (ii) second actinic ray irradiation is carried out after all the printing has been completed. Shrinkage of recording materials, occurring while the ink is being cured can be reduced by dividing actinic ray irradiation into those two steps.

So far, in a UV curable ink-jet method, usually a high power light source exceeding 1 kW·hr has been used in order to minimize spreading of dots and bleeding-out after the ink deposition on recording material. However, specifically in printing on shrink labels, the shrinkage of the recording material due to the UV irradiation has been too much for practical use.

In the present invention, actinic rays having a maximum luminance range of 280 to 320 nm is preferably used, and even when a light source with a power less than 1 kW·hr is used, images with high resolution can be formed, and shrinkage of a recording material is in the permissible range.

In the present invention, the power of light source used for irradiating an actinic ray is preferably less than 1 kW·hr. Examples of the light sources having a power of less than 1 kW·hr include a fluorescent lamp, a cold cathode tube and a LED, however, the present invention is not limited thereto.

The ink-jet recording apparatus (hereafter also referred to as "recording apparatus") of the present invention will now be explained.

The recording apparatus of the present invention will be explained suitably in reference to the drawings. Herein, the recording apparatus illustrated in the drawings is only an embodiment of a recording apparatus of the present invention, and the present invention is not limited thereto.

FIG. 1 shows a front view of the main section of the ink-jet recording apparatus of the present invention. Recording apparatus 1 is equipped with head carriage 2, recording head 3, irradiation member 4 and platen 5. In recording apparatus 1, platen 5 is provided under recording sheet P. Platen 5 functions also as a UV ray absorbing means, and absorbs excess UV rays having passed through recording sheet P. As a result, high resolution images are reproduced quite stably.

Recording sheet P is guided by guide member 6 to be moved to the back side from the front side in FIG. 1 by means of a transport member (not illustrated). Scanning of recording heads 3 mounted in the head carriage 2 is achieved by reciprocating head carriage 2 in the Y direction in FIG. 1 by means of a head scanning member (not illustrated).

Head carriage 2 is provided over recording sheet P, and stores a plurality of recording heads 3 described below with the ink ejection orifices oriented downward. Head carriage 2 is provided in the main body of recording apparatus 1 so as to reciprocate in the Y direction, as shown in FIG. 1, driven by a head scanning member.

Herein, FIG. 1 illustrates that head carriage 2 carries one recording head 3, however, in the present invention, the number of recording heads 3 mounted in head carriage 2 is the same as the number of different ink colors.

Recording heads 3 eject an actinic ray curable ink (for example, a UV curable ink) supplied by an ink supplying member (not illustrated) from the ink ejection orifices onto recording sheet P by action of plural ejecting members (not illustrated) equipped in the recording apparatus. The UV curable ink ejected from recording heads 3 is a composition containing a colorant, a polymerizable polymer and an initiator, and has a property to be cured via a cross-linking and polymerizing reaction initiated by irradiation of UV rays where the initiator works as a catalyst.

Recording heads 3 ejects ink as ink droplets onto a predetermined region (the region designated to receive the ink) of recording sheet P while the head is scanned from one edge to the other of the recording sheet in the Y direction in FIG. 1 by means of the head scanning member, whereby the ink is deposited on the designated region of the recording sheet.

The above scan is made several times as required to eject ink onto the region designated to receive the ink. After that, recording sheet P is transported from the front side to the back side of the page in FIG. 1 by a transport member and the scan of the recording heads 3 is again made, driven by the head scan member, whereby ink is ejected from the recording heads onto an adjacent region designated to receive the ink.

The above operation is repeatedly carried out, whereby the ink is ejected from recording heads 3 employing the head scan member and the transport member to form an image made of aggregates of ink droplets on recording sheet P.

Irradiation member 4 is equipped with a UV lamp which emits ultraviolet rays of a specific wavelength range at a stable exposure energy and a filter which transmits ultraviolet rays of a specific wavelength. Herein, examples of the UV lamp include a mercury lamp, a metal halide lamp, an excimer laser, a UV laser, a cold cathode tube, a hot cathode tube, a black light, and an LED (light emitting diode). Of these, a metal halide lamp giving a band-shaped light, a cold cathode tube, a mercury lamp and a black light are preferable. Specifically a cold cathode tube and a black light, which emit 254 nm ultraviolet rays are preferable, which can prevent bleeding-out, efficiently control a dot diameter, and reduce wrinkles on curing. Utilizing a black light as a radiation source of irradiation member 4 reduces the manufacturing cost for ink curing.

Irradiation member 4 has the possible largest size which can be installed in recording apparatus 1 (an ink jet printer) or the size which is larger than the region designated to receive the ink by one scan of recording heads 3, driven by the head scanning member.

Irradiation member 4 is equipped nearly in parallel with recording sheet P by fixing at the both sides of head carriage 2.

In order to adjust luminance at the ink ejection outlets, the entire recording heads 3 is light-shielded, however, in addition, it is preferable to make distance h2 between the ink ejection outlet 31 of recording heads 3 and recording sheet P greater than distance h1 between irradiation means 4 and recording sheet P (h1<h2) or to increase distance d between recording heads 3 and irradiation means 4 long (to make d large). Further, it is more preferable to provide bellows structure 7 between recording heads 3 and irradiation member 4.

Herein, the wavelength of ultraviolet rays, which are irradiated through irradiation member 4, is suitably changed by exchange of a UV lamp or a filter, which is mounted in irradiation member 4.

The ink-jet ink of the present invention has excellent ejection stability, and is specifically suitable for use in a line head type ink-jet recording apparatus.

Figure 2:
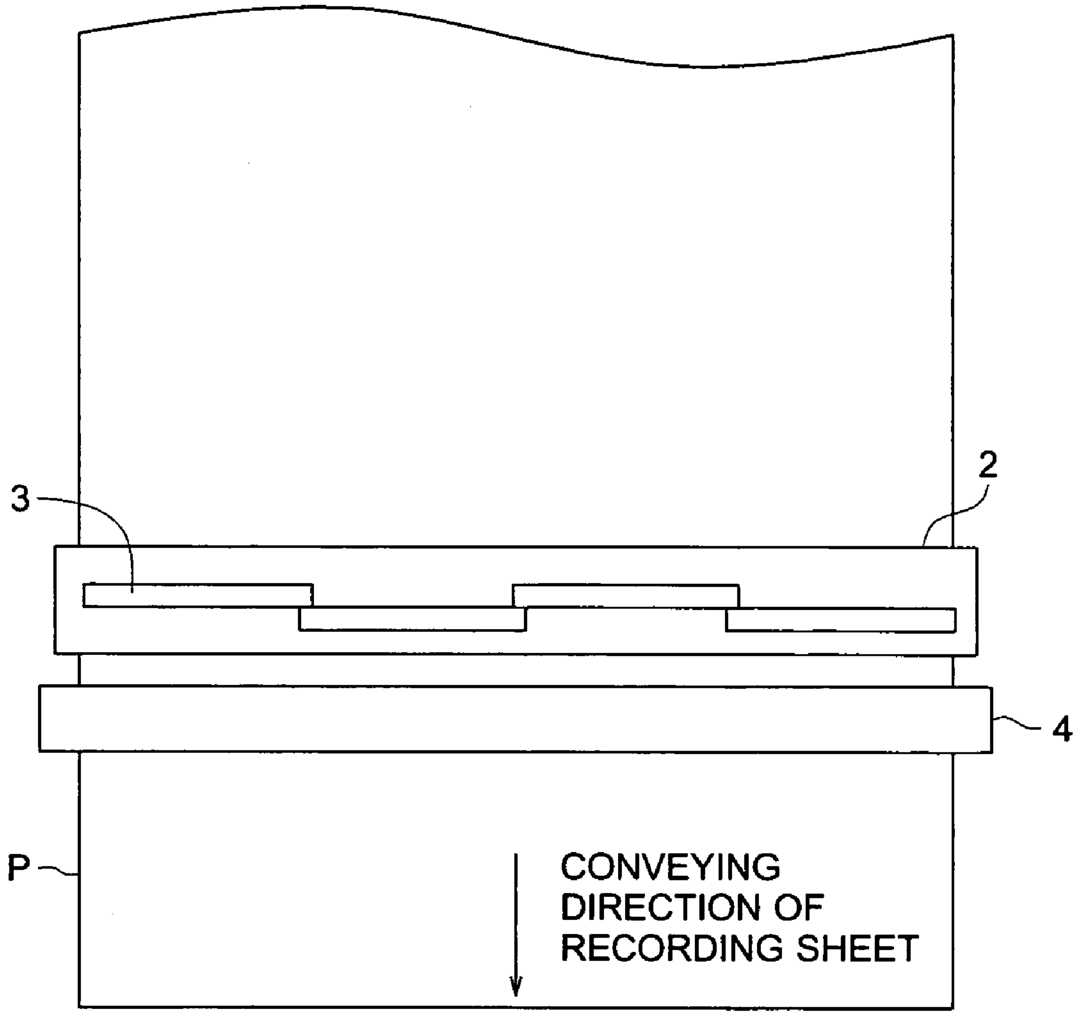
FIG. 2 is a top view of the main section of the ink-jet recording apparatus illustrating another embodiment of the present invention.

FIG. 2 shows a top view of the main section of the ink-jet recording apparatus explaining another embodiment of the present invention.

The ink-jet recording apparatus illustrated in FIG. 2 is called as a line head type ink-jet recording apparatus. Recording heads 3 are provided in head carriage 2, which covers the entire width of recording sheet P. The recording heads 3 each stores a different color ink.

Irradiation means 4 is provided just downstream of head carriage 2 to cover the entire width of recording sheet P and the entire printing surface. The same ultraviolet lamp as shown in FIG. 1 may be used in the irradiation means 4 in FIG. 2.

In the line head type recording apparatus, head carriage 2 and irradiation means 4 are fixed, and only recording sheet P is transported in the direction as shown in FIG. 2. Ink is ejected onto the recording sheet, which is subsequently transported and then exposed via the irradiation means to form a cured image on the recording sheet.

EXAMPLES

The present invention will now be explained using examples, however, the present invention is not limited thereto.

<<Preparation of Pigment Dispersions>>

<Preparation of Pigment Dispersion D-1>The following compounds were placed in a stainless-steel beaker and dissolved by agitating for one hour at 65° C. on a hot plate.

| | |
|---|---|
| PB822 (polymer dispersant, produced by Ajinomoto-Fine-Techno Co., Inc.) | 3 weight parts |
| OXT221 (oxetane compound, produced by Toagosei Co., Ltd.) | 77 weight parts |

After the solution was cooled to ambient temperature, the following pigments were added. The mixture was sealed in a glass bottle together with 200 g of zirconia beads having a diameter of 1 mm, and was dispersed for 2 hours using a paint shaker, followed by removing the zirconia beads to obtain Pigment Dispersion D-1.

| | |
|---|---|
| C.I. Pigment Blue 15:3 | 20 weight parts |
| CuPc-[$SO_2N(C_2H_5)_2$] | 0.8 weight parts |

Pc represents phthalocyanine.

<Preparation of Pigment Dispersion D-2>

The following compounds were placed in a stainless-steel beaker and dissolved by agitating for one hour at 65° C. on a hot plate.

| | |
|---|---|
| Solspers24000G (polymer dispersant, produced by Avecia Ltd.) | 3 weight parts |
| OXT221 (oxetane compound, produced by Toagosei Co., Ltd.) | 77 weight parts |

After the solution was cooled to ambient temperature, the following pigments were added. The mixture was sealed in a glass bottle together with 200 g of zirconia beads having a diameter of 1 mm, and was dispersed for 4 hours using a paint shaker, followed by removing the zirconia beads to obtain Pigment Dispersion D-2.

| | |
|---|---|
| C.I. Pigment Blue 15:3 | 20 weight parts |
| CuPc-[$SO_2NHCH_2CH_2N(CH_3)_2$] | 0.2 weight parts |

<Preparation of Pigment Dispersion D-3>

The following compounds were placed in a stainless-steel beaker and dissolved by agitating for one hour at 65° C. on a hot plate.

| | |
|---|---|
| PB822 (polymer dispersant, produced by Ajinomoto-Fine-Techno Co., Inc.) | 3 weight parts |
| OXT221 (oxetane compound, produced by Toagosei Co., Ltd.) | 77 weight parts |

After the solution was cooled to ambient temperature, the following pigments were added. The mixture was sealed in a glass bottle together with 200 g of zirconia beads having a diameter of 1 mm, and was dispersed for 2 hours using a paint shaker, followed by removing the zirconia beads to obtain Pigment Dispersion D-3.

| | |
|---|---|
| C.I. Pigment Blue 15:3 | 20 weight parts |

<Preparation of Pigment Dispersion D-4>The following compounds were placed in a stainless-steel beaker and dissolved by agitating for one hour at 65° C. on a hot plate.

| | |
|---|---|
| PB822 (polymer dispersant, produced by Ajinomoto-Fine-Techno Co., Inc.) | 30 weight parts |
| OXT221 (oxetane compound, produced by Toagosei Co., Ltd.) | 50 weight parts |

After the solution was cooled to ambient temperature, the following pigments were added. The mixture was sealed in a glass bottle together with 200 g of zirconia beads having a diameter of 1 mm, and was dispersed for 4 hours using a paint shaker, followed by removing the zirconia beads to obtain Pigment Dispersion D-4.

| | |
|---|---|
| C.I. Pigment Blue 15:3 | 20 weight parts |

<Preparation of Pigment Dispersion D-5>

The following compounds were placed in a stainless-steel beaker and dissolved by agitating for one hour at 65° C. on a hot plate.

| | |
|---|---|
| PB822 (polymer dispersant, produced by Ajinomoto-Fine-Techno Co., Inc.) | 20 weight parts |
| OXT221 (oxetane compound, produced by Toagosei Co., Ltd.) | 60 weight parts |

After the solution was cooled to ambient temperature, the following pigments were added. The mixture was sealed in a glass bottle together with 200 g of zirconia beads having a diameter of 1 mm, and was dispersed for 4 hours using a paint shaker, followed by removing the zirconia beads to obtain Pigment Dispersion D-5.

| | |
|---|---|
| C.I. Pigment Blue 15:3 | 20 weight parts |

<Preparation of Pigment Dispersion D-11>

The following compounds were placed in a stainless-steel beaker and dissolved by agitating for one hour at 65° C. on a hot plate.

| | |
|---|---|
| PB822 (polymer dispersant, produced by Ajinomoto-Fine-Techno Co., Inc.) | 5 weight parts |
| OXT221 (oxetane compound, produced by Toagosei Co., Ltd.) | 85 weight parts |

After the solution was cooled to ambient temperature, the following pigments were added. The mixture was sealed in a glass bottle together with 200 g of zirconia beads having a diameter of 1 mm, and was dispersed for 2 hours using a paint shaker, followed by removing the zirconia beads to obtain Pigment Dispersion D-11.

| | |
|---|---|
| MA7 (carbon black, BET surface area: 115 $m^2/g$, DBP oil absorption: 66 ml/100 g, produced by Mitsubishi Chemical Corp. | 10 weight parts |
| $CuPc-[SO_2N(C_2H_5)_2]$ | 0.4 weight parts |

<Preparation of Pigment Dispersion D-12>

The following compounds were placed in a stainless-steel beaker and dissolved by agitating for one hour at 65° C. on a hot plate.

| | |
|---|---|
| Solspers24000G (polymer dispersant, produced by Avecia Ltd.) | 4 weight parts |
| OXT212 (oxetane compound, produced by Toagosei Co., Ltd.) | 86 weight parts |

After the solution was cooled to ambient temperature, the following pigments were added. The mixture was sealed in a glass bottle together with 200 g of zirconia beads having a diameter of 1 mm, and was dispersed for 4 hours using a paint shaker, followed by removing the zirconia beads to obtain Pigment Dispersion D-12.

| | |
|---|---|
| #52 (carbon black, BET surface area: 88 $m^2/g$, DBP oil absorption: 63 ml/100 g, produced by Mitsubishi Chemical Corp. | 10 weight parts |
| $CuPc-[SO_2NHCH_2CH_2N(CH_3)_2]$ | 0.1 weight parts |

<Preparation of Pigment Dispersion D-13>

The following compounds were placed in a stainless-steel beaker and dissolved by agitating for one hour at 65° C. on a hot plate.

| | |
|---|---|
| PB822 (polymer dispersant, produced by Ajinomoto-Fine-Techno Co., Inc.) | 5 weight parts |
| OXT212 (oxetane compound, produced by Toagosei Co., Ltd.) | 85 weight parts |

After the solution was cooled to ambient temperature, the following pigments were added. The mixture was sealed in a glass bottle together with 200 g of zirconia beads having a diameter of 1 mm, and was dispersed for 2 hours using a paint shaker, followed by removing the zirconia beads to obtain Pigment Dispersion D-13.

| | |
|---|---|
| NIPex60 (carbon black, BET surface area: 115 $m^2/g$, DBP oil absorption: 115 ml/100 g, produced by Degussa Co. | 10 weight parts |
| $CuPc-[SO_2NHCH_2CH_2N(CH_3)_2]$ | 0.1 weight parts |

<Preparation of Pigment Dispersion D-14>

The following compounds were placed in a stainless-steel beaker and dissolved by agitating for one hour at 65° C. on a hot plate.

| | |
|---|---|
| PB822 (polymer dispersant, produced by Ajinomoto-Fine-Techno Co., Inc.) | 5 weight parts |
| OXT221 (oxetane compound, produced by Toagosei Co., Ltd.) | 85 weight parts |

After the solution was cooled to ambient temperature, the following pigments were added. The mixture was sealed in a glass bottle together with 200 g of zirconia beads having a diameter of 1 mm, and was dispersed for 2 hours using a paint shaker, followed by removing the zirconia beads to obtain Pigment Dispersion D-14.

| | |
|---|---|
| MA7 (carbon black, BET surface area: 115 $m^2/g$, DBP oil absorption: 66 ml/100 g, produced by Mitsubishi Chemical Corp. | 10 weight parts |

<Preparation of Pigment Dispersion D-15>

The following compounds were placed in a stainless-steel beaker and dissolved by agitating for one hour at 65° C. on a hot plate.

| | |
|---|---|
| PB822 (polymer dispersant, produced by Ajinomoto-Fine-Techno Co., Inc.) | 15 weight parts |
| OXT221 (oxetane compound, produced by Toagosei Co., Ltd.) | 75 weight parts |

After the solution was cooled to ambient temperature, the following pigments were added. The mixture was sealed in a glass bottle together with 200 g of zirconia beads having a diameter of 1 mm, and was dispersed for 4 hours using a paint shaker, followed by removing the zirconia beads to obtain Pigment Dispersion D-15.

| | |
|---|---|
| MA7 (carbon black, BET surface area: 115 $m^2/g$, DBP oil absorption: 66 ml/100 g, produced by Mitsubishi Chemical Corp. | 10 weight parts |

<Preparation of Pigment Dispersion D-16>The following compounds were placed in a stainless-steel beaker and dissolved by agitating for one hour at 65° C. on a hot plate.

| | |
|---|---|
| PB822 (polymer dispersant, produced by Ajinomoto-Fine-Techno Co., Inc.) | 10 weight parts |
| OXT221 (oxetane compound, produced by Toagosei Co., Ltd.) | 80 weight parts |

After the solution was cooled to ambient temperature, the following pigments were added. The mixture was sealed in a glass bottle together with 200 g of zirconia beads having a diameter of 1 mm, and was dispersed for 4 hours using a paint shaker, followed by removing the zirconia beads to obtain Pigment Dispersion D-16.

| | |
|---|---|
| MA7 (carbon black, BET surface area: 115 $m^2/g$, DBP oil absorption: 66 ml/100 g, produced by Mitsubishi Chemical Corp. | 10 weight parts |

<<Preparation of Ink Compositions>>

The additives shown in Table 1 were mixed with the above described pigment dispersions and the mixtures were filtered with a 1.0 μm membrane filter to form Ink Compositions 1 to 16. Also, the additives shown in Table 2 were mixed with the above described pigment dispersions and the mixtures were filtered with a 1.0 μm membrane filter to form Ink Compositions 101 to 117. The figures in Tables 1 and 2 express % by weight.

TABLE 1

| Ink | Colornat Pigment Dispersion | | Oxetane Compound | | Compound Having an Oxirane Ring 1 | | Compound Having an Oxirane Ring 2 | | Photo Polymerization Initiator | Surfactant | |
|---|---|---|---|---|---|---|---|---|---|---|---|
| No. | No. | Amount | OX221 | OX212 | No. | Amount | No. | Amount | SP-152 | F475 | Remarks |
| 1 | D-1 | 20.0 | 44.38 | — | EPA-7 | 35.00 | — | — | 0.60 | 0.02 | Inv. |
| 2 | D-1 | 20.0 | 54.48 | — | EPB-1 | 25.00 | — | — | 0.50 | 0.02 | Inv. |
| 3 | D-1 | 20.0 | 54.53 | — | PO | 25.00 | — | — | 0.45 | 0.02 | Inv. |
| 4 | D-1 | 20.0 | — | 50.61 | DEP | 29.00 | — | — | 0.38 | 0.01 | Inv. |
| 5 | D-1 | 20.0 | 44.48 | — | E-4030 | 35.00 | — | — | 0.50 | 0.02 | Inv. |
| 6 | D-1 | 20.0 | 52.50 | — | EPC-1 | 27.00 | — | — | 0.50 | — | Inv. |
| 7 | D-1 | 20.0 | 45.48 | 5.00 | EPD-9 | 29.00 | — | — | 0.50 | 0.02 | Inv. |
| 8 | D-1 | 20.0 | 56.48 | — | PO | 3.00 | EPC-1 | 20.00 | 0.51 | 0.01 | Inv. |
| 9 | D-2 | 22.0 | 55.48 | — | EPC-1 | 22.00 | — | — | 0.50 | 0.02 | Inv. |
| 10 | D-2 | 21.0 | 43.98 | 5.00 | EPB-1 | 29.50 | — | — | 0.50 | 0.02 | Inv. |
| 11 | D-3 | 20.0 | 51.48 | — | EPB-1 | 28.00 | — | — | 0.50 | 0.02 | Comp. |
| 12 | D-4 | 18.0 | 53.39 | 8.00 | DEP | 20.00 | — | — | 0.60 | 0.01 | Comp. |
| 13 | D-4 | 22.0 | — | 55.58 | E-4030 | 22.00 | — | — | 0.40 | 0.02 | Comp. |
| 14 | D-4 | 19.0 | 58.49 | — | E-4030 | 22.00 | — | — | 0.50 | 0.01 | Comp. |
| 15 | D-5 | 20.0 | 51.59 | — | EPB-1 | 28.00 | — | — | 0.39 | 0.02 | Comp. |
| 16 | D-5 | 21.0 | — | 55.48 | E-4030 | 23.00 | — | — | 0.50 | 0.02 | Comp. |

Inv.: Inventive Sample, Comp.: Comparative Sample

TABLE 2

| Ink No. | Colornat Pigment Dispersion No. | Colornat Pigment Dispersion Amount | Oxetane Compound OX221 | Oxetane Compound OX212 | Compound Having an Oxirane Ring 1 No. | Compound Having an Oxirane Ring 1 Amount | Compound Having an Oxirane Ring 2 No. | Compound Having an Oxirane Ring 2 Amount | Photo Polymerization Initiator SP-152 | Surfactant F475 | Remarks |
|---|---|---|---|---|---|---|---|---|---|---|---|
| 101 | D-11 | 30.0 | 36.39 | — | EPA-7 | 33.00 | — | — | 0.60 | 0.01 | Inv. |
| 102 | D-11 | 30.0 | 45.54 | — | EPB-1 | 24.00 | — | — | 0.45 | 0.01 | Inv. |
| 103 | D-11 | 30.0 | 41.48 | — | PO | 28.00 | — | — | 0.50 | 0.02 | Inv. |
| 104 | D-11 | 25.0 | — | 43.49 | DEP | 31.00 | — | — | 0.49 | 0.02 | Inv. |
| 105 | D-11 | 30.0 | 35.60 | — | E-4030 | 34.00 | — | — | 0.38 | 0.02 | Inv. |
| 106 | D-11 | 28.0 | 43.50 | — | EPC-1 | 28.00 | — | — | 0.50 | — | Inv. |
| 107 | D-11 | 31.0 | 35.51 | 5.00 | EPD-9 | 28.00 | — | — | 0.48 | 0.01 | Inv. |
| 108 | D-11 | 28.0 | 46.51 | — | PO | 4.00 | EPC-1 | 21.00 | 0.48 | 0.01 | Inv. |
| 109 | D-12 | 26.0 | 51.46 | — | EPC-1 | 22.00 | — | — | 0.52 | 0.02 | Inv. |
| 110 | D-12 | 28.0 | 37.84 | 5.00 | EPB-1 | 28.70 | — | — | 0.45 | 0.01 | Inv. |
| 111 | D-13 | 29.0 | — | 43.54 | EPB-7 | 27.00 | — | — | 0.45 | 0.01 | Inv. |
| 112 | D-14 | 31.0 | 41.48 | — | EPB-1 | 27.00 | — | — | 0.50 | 0.02 | Comp. |
| 113 | D-15 | 28.0 | 40.43 | 8.00 | DEP | 23.00 | — | — | 0.55 | 0.02 | Comp. |
| 114 | D-15 | 33.0 | — | 43.48 | E-4030 | 23.00 | — | — | 0.50 | 0.02 | Comp. |
| 115 | D-15 | 31.0 | 45.61 | — | E-4030 | 23.00 | — | — | 0.38 | 0.01 | Comp. |
| 116 | D-16 | 30.5 | 42.23 | — | EPB-1 | 26.80 | — | — | 0.46 | 0.01 | Comp. |
| 117 | D-16 | 27.9 | — | 46.58 | E-4030 | 25.00 | — | — | 0.50 | 0.02 | Comp. |

Inv.: Inventive Sample, Comp.: Comparative Sample

The details of the additives represented by the abbreviations in Table 1 are as follows.

Initiators (Oxetane Compounds)

OXT-221: di[1-ethyl(3-oxetanyl)]methyl ether (produced by Toagosei Co., Ltd.)

OXT-212: (produced by Toagosei Co., Ltd.)

(Epoxy Compounds)

EPA-7: Exemplified compound EPA-7

EPB-1: Exemplified compound EPB-1

EPC-1: Exemplified compound EPC-1

EPD-9: Exemplified compound EPD-9

PO: α-pinene oxide

DEP: 1,2:8,9 diepoxylimonene

E-4030: Sansocizer (produced by New Japan Chemical Co., Ltd.)

(Photo Polymerization Initiator)

SP-152: Triphenylsulfonium salt ("Adeka Optomer SP-152" produced by Asahi Denka Co., Ltd.)

(Surfactant)

F475: MEGAFACE F475 acrylic oligomer including perfluoro alkyl group (Produced by Dainippon Ink & Chemicals, Inc.)

<<Formation of Ink-Jet Images>>

<Image Formation Method A>

Each of Ink Compositions 1 to 16 and 101 to 117 as prepared above was mounted on a carriage type ink-jet recording apparatus as shown in FIG. 1 having piezo ink jet nozzles, and image recording was carried out continuously on a 120 μm thick, 600 mm wide and 500 m long recording sheets. An ink supply system included an ink tank, a supply pipe, a pre-chamber ink tank just before a head, a piping equipped with a filter, and a piezo-head, and the portion from the pre-chamber tank to the head was heated at 50° C. The piezo-head was driven so as to eject ink droplets of 2 to 20 pl at a resolution of 720 dpi×720 dpi. Thus, each ink composition was continuously ejected onto the recording sheet, and, within 0.5 seconds after the ink arrived at the recording sheet, the ink was cured by the irradiation from the light sources on both sides of the carriage. The thickness of the resulting ink image layer was measured to be in the range of 2.3 to 13 μm. Herein, dpi represents a dot number per 2.54 cm. The above ink-jet ink image formation was carried out at 25° C. under 30% RH according to the image formation method described above.

<Image Formation Method B>

Another set of image forming was carried out using Ink Compositions 1 to 16 and 101 to 117 in the same manner as the above Image Forming Method A except that a line head as illustrated in FIG. 2 was used instead of the carriage type ink-jet head.

Details of the irradiation light source used in the above Image Forming Methods were as follows.

Light Source used in Image Forming Method A:

High pressure mercury lamp VZero085 (produced by INTEGRATION TECHNOLOGY, peak wavelength: 254 nm, and maximum luminance: 400 $mW/cm^2$)

Light Source used in Image Forming Method B:

Low pressure mercury lamp: (Iwasaki Electric Co., Ltd., special order product, five lamps were used to form a line light source, irradiation area: 120mm(longitudinal direction)×620mm (lateral direction), peak wavelength: 254 nm, maximum luminance: 50 $mW/cm^2$)

The above luminance was measured using UVPF-A1 (produced by Iwasaki Electric Co., Ltd.) as a integrated luminance at wavelength of 254 nm.

<<Evaluation of Image Forming and Ink>>

(Evaluation of Curability)

Curability of each image just after irradiation of actinic rays was manually evaluated by touching the image by fingers, according to the following criteria.

A: No sticky sensation was felt on the image surface and the image was sufficiently cured.

B: A slight sticky sensation was felt on the image surface, however, the image was cured.

C: A sticky sensation was felt on the image surface, and the image was almost cured.

D: The image was not cured and the ink drifted.

(Evaluation of Storage Stability of the Ink)

Each ink was sealed in a glass bottle and kept for 3 days at 60° C., and the sedimentation of the pigment was visually evaluated according to the following criteria.

A: No sedimentation of pigment was observed.

B: Almost no sedimentation of pigment was observed when the bottle was left at rest, however, when the bottle was shaken, aggregated pigment was left on the wall.

C: Sedimentation of aggregated pigment was clearly observed at the bottom of the glass bottle.

The obtained results were summarized in Table 2.

TABLE 3

| Ink Composition No. | Evaluation of Curability: Image Forming Method A | Image Forming Method B | Storing Stability of the Ink | Remarks |
|---|---|---|---|---|
| 1 | A | A | A | Inv. |
| 2 | A | A | A | Inv. |
| 3 | A | A | A | Inv. |
| 4 | A | A | A | Inv. |
| 5 | A | A | A | Inv. |
| 6 | A | A | A | Inv. |
| 7 | A | A | A | Inv. |
| 8 | A | A | A | Inv. |
| 9 | B | A | A | Inv. |
| 10 | B | A | A | Inv. |
| 11 | B | A | C | Comp. |
| 12 | D | D | A | Comp. |
| 13 | D | D | A | Comp. |
| 14 | D | D | A | Comp. |
| 15 | C | D | B | Comp. |
| 16 | C | D | B | Comp. |
| 101 | A | A | A | Inv. |
| 102 | A | A | A | Inv. |
| 103 | A | A | A | Inv. |
| 104 | A | A | A | Inv. |
| 105 | A | A | A | Inv. |
| 106 | A | A | A | Inv. |
| 107 | A | A | A | Inv. |
| 108 | A | A | A | Inv. |
| 109 | A | A | A | Inv. |
| 110 | A | A | A | Inv. |
| 111 | B | B | A | Inv. |
| 112 | B | B | C | Comp. |
| 113 | D | D | A | Comp. |
| 114 | D | D | A | Comp. |
| 115 | D | D | A | Comp. |
| 116 | C | D | B | Comp. |
| 117 | C | D | B | Comp. |

Inv.: Inventive Sample, Comp.: Comparative Sample

As shown in Table 2, the ink of the present invention (an actinic ray curable composition) containing a phthalocyanine pigment, a dispersant, a cationically polymerizable monomer, a photo acid generator and a phthalocyanine derivative, exhibited superior curability of the image to thaose of the comparative samples, when compared either by using carriage type ink-jet recording apparatus or by using line head type ink-jet recording apparatus. Also, the ink of the present invention exhibited superior storage stability to those of the comparative samples even under long term storage at a high temperature.

What is claimed is:

1. An actinic ray curable composition comprising:

a phthalocyanine pigment or a carbon black pigment;

a dispersant;

a cationically polymerizable monomer;

a photoacid generator; and a phthalocyanine derivative, wherein the phthalocyanine derivative is represented by Formula (B), (C), or (D):

Formula (B)

$CuPc-(SO_3H)_n$ wherein Pc represents phthalocyanine and n represents an integer of 1 to 4, Formula (C)

$CuPc-(X—NR^1R^2)_n$ where Pc represents phthalocyanine, X represents a divalent linking group, $R^1$ and $R^2$ each independently represent an alkyl group, $R^1$ and $R^2$ may be combined to form a ring which may contain a hetero atom and n represents an integer of 1 to 4, Formula (D)

$CuPc-(N{=}N-Ph-Z)_n$ wherein Pc represents phthalocyanine, Ph represents a phenyl group, and Z represents an amino group, a carboxylic acid group or its salt, a sulfonic acid group or its salt, a carbamoyl group which may be substituted, or a sulfamoyl group which may be substituted.

2. The actinic ray curable composition of claim 1 containing the phthalocyanine pigment.

3. The actinic ray curable composition of claim 1 containing the carbon black pigment.

4. The actinic ray curable composition of claim 1, wherein the cationically polymerizable monomer has an oxetane ring in the molecule.

5. The actinic ray curable composition of claim 4, further containing an cationically polymerizable monomer having an oxirane ring in the molecule.

6. The actinic ray curable composition of claim 5, wherein the cationically polymerizable monomer having an oxirane ring is represented by Formula (1):

Formula (1)

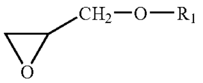

wherein $R_1$ represents a substituted or unsubstituted alkyl group of 1 to 10 carbon atoms, a substituted or unsubstituted aromatic group or an acyl group.

7. The actinic ray curable composition of claim 5, wherein the cationically polymerizable monomer having an oxirane ring is represented by Formula (2):

Formula (2)

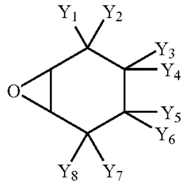

wherein $Y_1$ to $Y_8$ each independently represent a hydrogen atom, a substituted or unsubstituted alkyl group, a carbonyl group or an ether group.

8. The actinic ray curable composition of claim 5, wherein the cationically polymerizable monomer having an oxirane ring is α-pinene oxide.

9. The actinic ray curable composition of claim 5, wherein the cationically polymerizable monomer having an oxirane ring is 1,2:8,9-diepoxylimonene.

10. The actinic ray curable composition of claim 5, wherein the cationically polymerizable monomer having an oxirane ring is an epoxidized vegetable oil having an unsaturated bond in the molecule.

11. The actinic ray curable composition of claim 5, wherein the cationically polymerizable monomer having an oxirane ring is represented by Formula (A):

Formula (A)

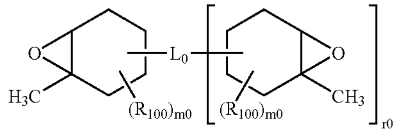

wherein $R_{100}$ represents a substituent, m0 represents an integer of 0 to 2, r0 represents an integer of 1 to 3 and $L_0$ represents a single bond or a linking group having 1 to 15 carbon atoms and a valence of r0+1, which may have an oxygen atom or a sulfur atom in a main chain of the linking group.

12. An image forming method comprising the steps of:

ejecting droplets of the actinic ray curable composition of claim 1 onto a recording sheet to form an image; and irradiating actinic rays to the formed image, wherein the irradiating step is carried out between 0.001 and 1 second after the ejected droplets reach the recording sheet.

13. An image forming method comprising the steps of: ejecting droplets of the actinic ray curable composition of claim 1 onto a recording sheet to form an image; and irradiating actinic rays to the formed image, wherein a thickness of the actinic ray curable composition cured via irradiating the actinic rays is in the range of 2 to 25 μm.

14. An image forming method comprising the steps of:

ejecting droplets of the actinic ray curable composition of claim 1 onto a recording sheet to form an image; and irradiating actinic rays to the formed image, wherein the droplets of the actinic ray curable composition ejected from each nozzle of the ink-jet recording head have a volume of 2 to 20 pl.

15. An image forming method comprising the steps of:

ejecting droplets of the actinic ray curable composition of claim 1 onto a recording sheet to form an image; and irradiating actinic rays to the formed image, wherein the ink-jet recording head is a line head.

16. An ink-jet recording apparatus for carrying out the image forming method of claim 12, wherein the actinic ray curable composition and the ink-jet recording head are heated at 35 to 100° C. before ejecting the actinic ray curable composition from the ink-jet recording head.

17. The actinic ray curable composition of claim 1, wherein the phthalocyanine derivative is represented by Formula (B).

18. The actinic ray curable composition of claim 1, wherein the phthalocyanine derivative is represented by Formula (C).

19. The actinic ray curable composition of claim 1, wherein the phthalocyanine derivative is represented by Formula (D).

* * * * *